(12) United States Patent
Bordes et al.

(10) Patent No.: US 11,949,910 B2
(45) Date of Patent: Apr. 2, 2024

(54) METHOD AND APPARATUS FOR VIDEO ENCODING AND DECODING BASED ON ILLUMINATION COMPENSATION

(71) Applicant: InterDigital VC Holdings, Inc., Wilmington, DE (US)

(72) Inventors: Philippe Bordes, Cesson-Sevigne (FR); Franck Galpin, Cesson-Sevigne (FR); Fabien Racape, Palo Alto, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/652,547

(22) PCT Filed: Sep. 28, 2018

(86) PCT No.: PCT/US2018/053464
§ 371 (c)(1),
(2) Date: Mar. 31, 2020

(87) PCT Pub. No.: WO2019/070531
PCT Pub. Date: Apr. 11, 2019

(65) Prior Publication Data
US 2020/0244990 A1    Jul. 30, 2020

(30) Foreign Application Priority Data
Oct. 5, 2017    (EP) .................................... 17306334

(51) Int. Cl.
*H04N 19/577*    (2014.01)
*H04N 19/583*    (2014.01)
(52) U.S. Cl.
CPC ......... *H04N 19/577* (2014.11); *H04N 19/583* (2014.11)

(58) Field of Classification Search
CPC .. H04N 19/577; H04N 19/583; H04N 19/132; H04N 19/176; H04N 19/513
(Continued)

(56) References Cited

U.S. PATENT DOCUMENTS 8,934,548 B2     1/2015  Sekiguchi et al.
2007/0177672 A1*  8/2007  Yang .................... H04N 19/197
                                                375/240.25
(Continued)

FOREIGN PATENT DOCUMENTS

CA        2986613 A1    11/2016
CN      101325715 A     12/2008
(Continued)

OTHER PUBLICATIONS

Alexander et al., "Bi-directional Optical Flow for Future Video Codec", 2016 Data Compression Conference (DCC), SnowBird, Utah, USA, Mar. 30, 2016, pp. 83-90.
(Continued)

*Primary Examiner* — Matthew K Kwan
(74) *Attorney, Agent, or Firm* — CONDO ROCCIA KOPTIW LLP

(57) ABSTRACT

Methods (1500, 1600) and apparatuses (700, 900, 1700) for video coding and decoding are provided. The method of video encoding (1500) includes determining (1510) a set of parameters for illumination compensation associated with a first motion compensated reference block of a block in a picture of a video based on a function of a set of samples of the first motion compensated reference block and a set of samples of a second motion compensated reference block of the block, processing (1520) a prediction of the block based on the set of parameters, the prediction being associated with the first motion compensated reference block and encoding (1530) the block based on the processed prediction. A
(Continued)

bitstream formatted to include encoded data, a computer-readable storage medium and a computer program product are also described.

26 Claims, 14 Drawing Sheets

(58) Field of Classification Search
USPC .................................................... 375/240.13
See application file for complete search history.

(56) References Cited

U.S. PATENT DOCUMENTS

| | | | | |
|---|---|---|---|---|
| 2008/0130750 | A1* | 6/2008 | Song | H04N 19/117 |
| | | | | 375/E7.031 |
| 2008/0304760 | A1 | 12/2008 | Lee et al. | |
| 2010/0027659 | A1* | 2/2010 | Jeon | H04N 19/597 |
| | | | | 375/240.15 |
| 2013/0034164 | A1 | 2/2013 | Shibahara et al. | |
| 2016/0037177 | A1 | 2/2016 | Park et al. | |
| 2016/0295227 | A1 | 10/2016 | Park et al. | |
| 2016/0366415 | A1 | 12/2016 | Liu et al. | |
| 2016/0366416 | A1* | 12/2016 | Liu | H04N 19/109 |
| 2018/0098086 | A1* | 4/2018 | Chuang | H04N 19/625 |
| 2019/0230350 | A1* | 7/2019 | Chen | H04N 19/573 |

FOREIGN PATENT DOCUMENTS

| | | |
|---|---|---|
| CN | 106031175 A | 10/2016 |
| JP | 5840286 B2 | 1/2016 |
| WO | 2011/129067 A1 | 10/2011 |
| WO | 2014163454 A1 | 10/2014 |
| WO | WO 2017197146 A1 | 11/2017 |

OTHER PUBLICATIONS

Song et al., "Interpolative Mode Prediction for Efficient MPEG-2 Video Encoding", Proceedings of SPIE, vol. 5308, Visual Communications and Image Processing 2004, Jan. 18, 2004, pp. 833-840.

Kikuchi et al., "Improved Multiple Frame Motion Compensation Using Frame Interpolation", Joint Video Team (JVT) of ISO/IEC MPEG & ITU-T VCEG (ISO/IEC JTC1/SC29/WG 11 and ITU-T SG16 Q.6), Document JVT-B075, 2nd Meeting, Geneva, Switzerland, Jan. 29, 2002, 8 pages.

Chen et al., "Algorithm Description of Joint Exploration Test Model 5 (JEM 5)", Joint Video Exploration Team (JVET) of ITU-T SG 16 WP 3 and ISO/IEC JTC 1/SC 29/WG 11, Document JVET-E1001-v2, 5th meeting, Geneva, Switzerland, Jan. 12, 2017, 41 pages.

Strom et al., "Bilateral Loop Filter in Combination with SAO", 2019 Picture Coding Symposium (PCS), Ningbo, China Nov. 12, 2019, 5 pages.

Chen, et al., "Algorithm Description of Joint Exploration Test Model 3", JVET-C1001_v3, Editors, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 pages.

Chen, et al., "Algorithm Description of Joint Exploration Test Model 6 (JEM 6)", Joint Video Exploration Team (JVET) of ITU-T SG 16 WP 3 and ISO/IEC JTC 1/SC 29/WG 11, Document JVET-F1001 v3, 6th Meeting, Hobart, Australia, Mar. 31, 2017, 50 pages.

English Language Translation, Japanese Patent No. 5840286 B2.

* cited by examiner

METHOD AND APPARATUS FOR VIDEO ENCODING AND DECODING BASED ON ILLUMINATION COMPENSATION

CROSS REFERENCE TO RELATED APPLICATIONS

This application is the national stage entry under 35 U.S.C. § 371 of International Application PCT/US2018/053464, filed Sep. 28, 2018, which was published in accordance with PCT Article 21(2) on Apr. 11, 2019, in English, and which claims the benefit of European Patent Application No. 17306334.8, filed Oct. 5, 2017.

TECHNICAL FIELD

The present embodiments generally relate to video encoding and decoding, particularly to illumination compensation.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

To achieve high compression efficiency, image and video coding schemes usually employ prediction and transform to leverage spatial and temporal redundancy in the video content. Generally, intra or inter prediction is used to exploit the intra or inter frame correlation. Then the differences between the original image and the predicted image, often denoted as prediction errors or prediction residuals, are transformed, quantized and entropy coded. To reconstruct the video, the compressed data is decoded by inverse processes corresponding to the prediction, transform, quantization and entropy coding.

In inter prediction mode, the use of block-based Illumination Compensation (IC) permits correcting block prediction samples obtained via Motion Compensation (MC) by considering any spatial or temporal local illumination variation (e.g., brightness). In one existing method, the IC parameters are estimated by comparing an L-shaped set of reconstructed neighboring samples for a current block in a picture with the corresponding L-shaped set of reconstructed neighboring samples for a reference block. In the case of bi-prediction (i.e., two reference blocks per current block), the corresponding L-shaped set of reconstructed neighboring samples for two reference-i blocks (i=0 or 1) are separately compared to the L-shaped set of reconstructed neighboring samples for the current block.

FIG. 1 illustrates an L-shaped set 170 of reconstructed neighboring samples for a current block 160 in a current picture 150, a corresponding L-shaped set (L-shape-ref-0) 130 for a motion compensated reference 0 block (ref-0, also herein called MC-0 or motion compensated 0 block) 120 in a reference 0 picture 110 and a corresponding L-shaped set (L-shape-ref-1) 135 for a motion compensated reference 1 block (ref-1, also herein called MC-1 or motion compensated 1 block) 125 in a reference 1 picture 115 in accordance with the prior art. Therefore, the term reference i block or ref-i (i=0,1) in the following disclosure corresponds to a motion compensated reference block, that is, the block situated at position $(x+MV_{ix}, y+MV_{iy})$ in the reference picture 'i', where (x, y) is the position of the current block in the current picture, where MV stands for motion vector. In FIG. 1, the motion vector between the current block 160 and the reference 0 block 120 is identified as MV0 140 and the motion vector between the current block 160 and the reference 1 block 125 is identified as MV1 145.

The IC model is typically linear and defined by:

$$IC(x) = a*x + b \quad (1)$$

where a and b are the IC parameters, generally called slope and intercept of the linear function, respectively.

In particular the IC parameters are estimated by minimizing the difference between the samples in the L-shaped set 170 for the current block and the samples in the L-shaped set (130 or 135) for the reference block (120 or 125) corrected with the IC parameters. The difference between the samples is minimized under the least squares method as follows:

$$(a_i, b_i) = \operatorname*{argmin}_{a,(b)} \left( \sum_{\substack{x \in L\text{-shape-cur}, \\ y \in L\text{-shape-ref}-i}} (x - a*y - b)^2 \right) \quad (2)$$

where i is the reference index, 0 or 1. $(a_i, b_i)$ are the optimum parameters associated with reference i, argmin(.) is the argument of the minimum and the summation is over each sample x in the L-shape-cur paired with its corresponding sample y in the L-shape-ref-i.

FIG. 2 illustrates a flowchart 200 for a method of generating block prediction in bi-prediction mode based on illumination compensation in accordance with the prior art. The method 200 includes computing or determining the IC parameters associated with each reference block and applying them to the respective block predictions. By relating to the elements of FIG. 1, the L-shaped sets 170, 130 and 135 for the current block 160, reference 0 block 120 and reference 1 block 125, respectively, are obtained on the respective steps 205, 210 and 215 of FIG. 2. The IC parameters $(a_0, b_0)$ and $(a_1, b_1)$ in equation 2 are independently computed, derived or determined from L-shaped sets 170 and 130 in step 220 and from L-shaped sets 170 and 135 in step 225, respectively. Then, the two predictions (pred0 associated with reference 0 and pred1 associated with reference 1) for the current block 160 are also independently computed or determined in steps 230 and 235, respectively. It is to be understood that ref-0 (or ref-1) and pred0 (or pred1) are corresponding motion compensated reference blocks of the current block, which may have the same resolution or not. For example, pred0 (or pred1) may be obtained from sub-pel precision MV values while ref-0 (or ref-1) may be obtained from full-precision MV values derived from the sub-pel MV value used to generate pred0 (or pred1). Therefore, they are herein distinguished as motion compensated reference block (ref-0, ref-1) and prediction (pred0, pred1).

Moreover, the determined IC parameters $(a_0, b_0)$ and $(a_1, b_1)$ are independently applied on the predictions pred0 and pred1 of the current block, in steps 240 and 245, respectively, according to equation 1, that is, the IC(x) function is used to transform each sample or pixel x of the predicted block (pred0 or pred1) associated with the current block.

Finally, in step 250, the two predictions are combined into one bi-prediction, biPred, as well-known by a person skilled in the art of compression. Combining means that the samples of prediction blocks, pred0 and pred1 are jointly processed to form a sample of biPred, e.g., as:

$$x_{biPred} = (x_{pred0} + x_{pred1} + 1)/2 \quad (3)$$

where $x_{bipred}$, $x_{pred0}$ and $x_{pred1}$ are samples or pixels of biPred, pred0 and pred1 respectively.

Illumination compensation may also be performed based on the current picture 150 and only one of the references pictures in FIG. 1, e.g., reference 0 picture 110. The uni-IC may then be described by steps 205, 210, 220, 230 and 240 (or by steps 205, 215, 225, 235, 245 and 250) of flowchart 200.

SUMMARY

According to an aspect of the present disclosure, a method of video encoding is provided including determining a set of parameters for illumination compensation associated with a first motion compensated reference block of a block in a picture of a video based on a function of a set of samples of the first motion compensated reference block and a set of samples of a second motion compensated reference block of the block, processing a prediction of the block based on the set of parameters, the prediction being associated with the first motion compensated reference block and encoding the block based on the processed prediction.

According to an aspect of the present disclosure, an apparatus for video encoding is provided, the apparatus including means for determining a set of parameters for illumination compensation associated with a first motion compensated reference block of a block in a picture of a video based on a function of a set of samples of the first motion compensated reference block and a set of samples of a second motion compensated reference block of the block, means for processing a prediction of the block based on the set of parameters, the prediction being associated with the first motion compensated reference block and means for encoding the block based on the processed prediction.

According to an aspect of the present disclosure, an apparatus for video encoding is provided, the apparatus including a processor, and at least one memory coupled to the processor, the processor being configured to determine a set of parameters for illumination compensation associated with a first motion compensated reference block of a block in a picture of a video based on a function of a set of samples of the first motion compensated reference block and a set of samples of a second motion compensated reference block of the block, process a prediction of the block based on the set of parameters, the prediction being associated with the first motion compensated reference block and encode the block based on the processed prediction.

According to an aspect of the present disclosure, a bitstream formatted to include encoded data representative of a block of a picture, the encoded data encoded by determining a set of parameters for illumination compensation associated with a first motion compensated reference block of a block in a picture of a video based on a function of a set of samples of the first motion compensated reference block and a set of samples of a second motion compensated reference block of the block, processing a prediction of the block based on the set of parameters, the prediction being associated with the first motion compensated reference block and encoding the block based on the processed prediction.

According to an aspect of the present disclosure, a signal including a bitstream formatted to include encoded data representative of a block of a picture, the encoded data encoded by determining a set of parameters for illumination compensation associated with a first motion compensated reference block of a block in a picture of a video based on a function of a set of samples of the first motion compensated reference block and a set of samples of a second motion compensated reference block of the block, processing a prediction of the block based on the set of parameters, the prediction being associated with the first motion compensated reference block and encoding the block based on the processed prediction.

According to an aspect of the present disclosure, a method of video decoding is provided including determining a set of parameters for illumination compensation associated with a first motion compensated reference block of a block in a picture of an encoded video based on a function of a set of samples of the first motion compensated reference block and a set of samples of a second motion compensated reference block of the block, processing a prediction of the block based on the set of parameters, the prediction being associated with the first motion compensated reference block and decoding the block based on the processed prediction.

According to an aspect of the present disclosure, an apparatus for video decoding is provided, the apparatus including means for determining a set of parameters for illumination compensation associated with a first motion compensated reference block of a block in a picture of an encoded video based on a function of a set of samples of the first motion compensated reference block and a set of samples of a second motion compensated reference block of the block, means for processing a prediction of the block based on the set of parameters, the prediction being associated with the first motion compensated reference block and means for decoding the block based on the processed prediction.

According to an aspect of the present disclosure, an apparatus for video decoding is provided, the apparatus including a processor, and at least one memory coupled to the processor, the processor being configured to determine a set of parameters for illumination compensation associated with a first motion compensated reference block of a block in a picture of an encoded video based on a function of a set of samples of the first motion compensated reference block and a set of samples of a second motion compensated reference block of the block, process a prediction of the block based on the set of parameters, the prediction being associated with the first motion compensated reference block and decode the block based on the processed prediction.

According to an aspect of the present disclosure, a computer program product is provided including program code instructions for determining a set of parameters for illumination compensation associated with a first motion compensated reference block of a block in a picture of a video based on a function of a set of samples of the first motion compensated reference block and a set of samples of a second motion compensated reference block of the block, processing a prediction of the block based on the set of parameters, the prediction being associated with the first motion compensated reference block and encoding the block based on the processed prediction.

According to an aspect of the present disclosure, a computer program product is provided including program code instructions for determining a set of parameters for illumination compensation associated with a first motion compensated reference block of a block in a picture of an encoded video based on a function of a set of samples of the first motion compensated reference block and a set of samples of a second motion compensated reference block of the block, processing a prediction of the block based on the set of parameters, the prediction being associated with the first motion compensated reference block and decoding the block based on the processed prediction.

According to an aspect of the present disclosure, a computer-readable storage medium carrying a software program is provided including program code instructions for determining a set of parameters for illumination compensation associated with a first motion compensated reference block of a block in a picture of a video based on a function of a set of samples of the first motion compensated reference block and a set of samples of a second motion compensated reference block of the block, processing a prediction of the block based on the set of parameters, the prediction being associated with the first motion compensated reference block and encoding the block based on the processed prediction.

According to an aspect of the present disclosure, a computer-readable storage medium carrying a software program is provided including program code instructions for determining a set of parameters for illumination compensation associated with a first motion compensated reference block of a block in a picture of an encoded video based on a function of a set of samples of the first motion compensated reference block and a set of samples of a second motion compensated reference block of the block, processing a prediction of the block based on the set of parameters, the prediction being associated with the first motion compensated reference block and decoding the block based on the processed prediction.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

Additional features and advantages of the present disclosure will be made apparent from the following detailed description of illustrative embodiments which proceeds with reference to the accompanying figures.

BRIEF DESCRIPTION OF THE DRAWINGS

The present disclosure may be better understood in accordance with the following exemplary figures briefly described below.

DETAILED DESCRIPTION

Figure 1:
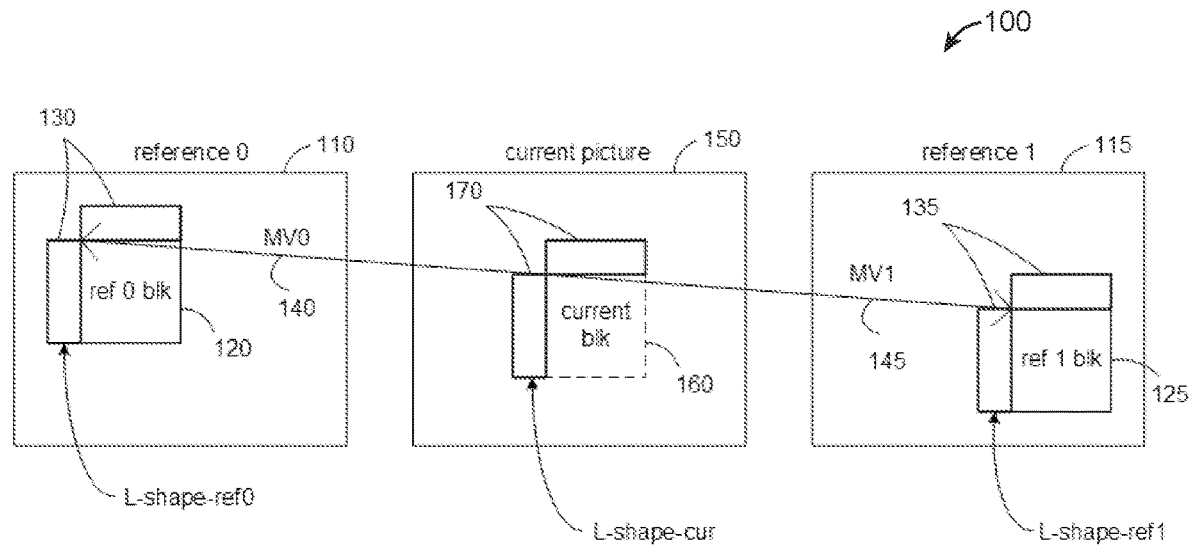
FIG. 1 illustrates an L-shaped set of reconstructed neighboring samples for a current block in a current picture, for a reference 0 block in a reference 0 picture and for a reference 1 block in a reference 1 picture in accordance with the prior art.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

It is to be understood that the figures and descriptions have been simplified to illustrate elements that are relevant for a clear understanding of the present disclosure, while eliminating, for purposes of clarity, many other elements found in typical encoding and/or decoding devices.

It will be understood that, although the terms first and second may be used herein to describe various elements, these elements should not be limited by these terms. These terms are only used to distinguish one element from another. Various methods are described above, and each of the methods comprises one or more steps or actions for achieving the described method. Unless a specific order of steps or actions is required for proper operation of the method, the order and/or use of specific steps and/or actions may be modified or combined.

It is to be understood that a picture may be an array of luma samples in monochrome format, or an array of luma samples and two corresponding arrays of chroma samples in 4:2:0, 4:2:2, and 4:4:4 color format or three arrays of three color components (e.g. RGB). In HEVC, a "block" addresses a specific area in a sample array (e.g., luma Y), and a "unit" includes the collocated block of all encoded color components (luma Y and possibly chroma Cb and chroma Cr), syntax elements and prediction data that are associated with the block (e.g., motion vectors). However, the term "block" is more generally used herein to refer to a block (e.g. a coding block (CB), transform block (TB), coding group (CG), etc.) or a unit (e.g. a CU).

It is to be understood that a picture or block of pixels or transform coefficients is a two-dimensional array or matrix. The horizontal or x direction (or axis) represents a width and the vertical or y direction (or axis) represents a height. The indexes start at 0. The x direction represents columns and the y direction represents rows. The maximum x index is the width−1. The maximum y index is the height−1.

In the following sections, the word "reconstructed" and "decoded" may be used interchangeably. Usually but not necessarily "reconstructed" is used on the encoder side while "decoded" is used on the decoder side. Also, the words "coded" and "encoded" may be used interchangeably. Moreover, the words "image", "picture", "frame" and slice (that is, a parat of a picture) may be used interchangeably. Furthermore, the words "coding", "source coding" and "compression" may be used interchangeably.

Figure 3:
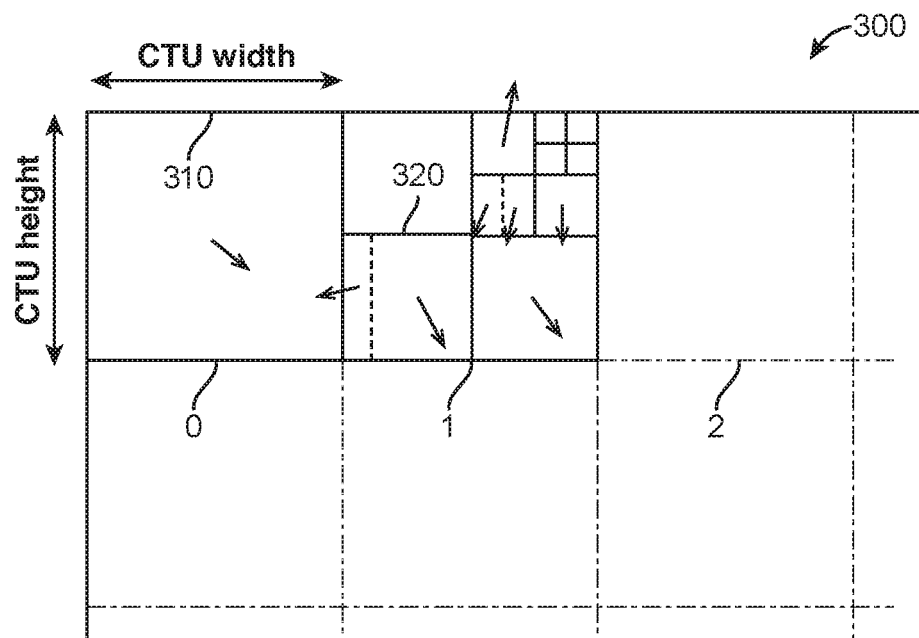
FIG. 3 illustrates a CTU split into CUs and PUs in accordance with the HEVC standard.
Figure 4:
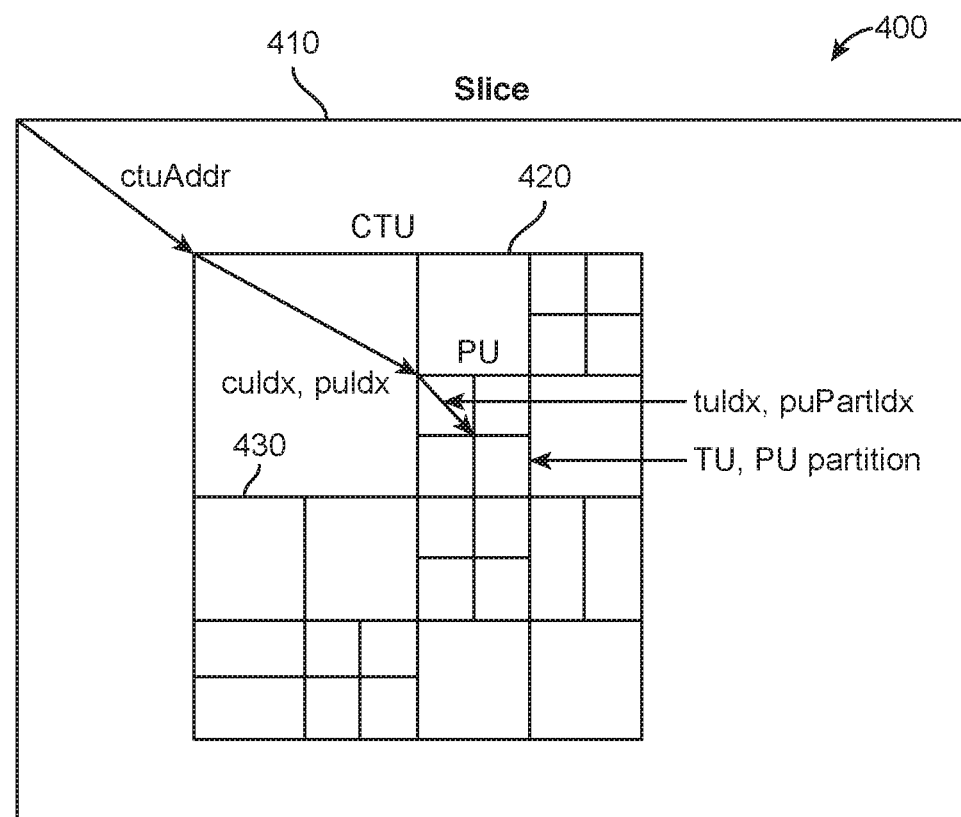
FIG. 4 illustrates the splitting of a CTU into CUs, PUs and TUs in accordance with the HEVC standard.

In the High Efficiency Video Coding (HEVC) standard ("ITU-T H.265 Telecommunication standardization sector of ITU (10/2014), series H: audiovisual and multimedia systems, infrastructure of audiovisual services—coding of moving video, High efficiency video coding, Recommendation ITU-T H.265"), a picture is partitioned into coding tree units (CTU) of square shape with a configurable size typically 64×64, 128×128, or 256×256. As illustrated in FIG. 3, a CTU 310 is the root of a quad-tree partitioning into leaves called Coding Units (CU). For each CU, a prediction mode is signaled which indicates whether the CU is coded using intra or inter prediction. As illustrated in FIG. 4, a consecutive set of CTUs (e.g., CTU 420) may be grouped into a slice 410. A CU (e.g., CU 430) may be partitioned into one or more Prediction Units (PU) and forms the root of a quad-tree (known as transform tree) partitioning into Transform Units (TUs). Asymmetric subdivision of the CU into PUs is also possible in inter prediction, that is if a CU has a size N×N, a PU may have a size N/4×N, 3N/4×N, N×N/4, N×3N/4. Each PU is assigned some prediction information, for instance motion information, spatial intra prediction, etc. PUs are also shown in FIG. 3 as dashed lines.

Figure 5:
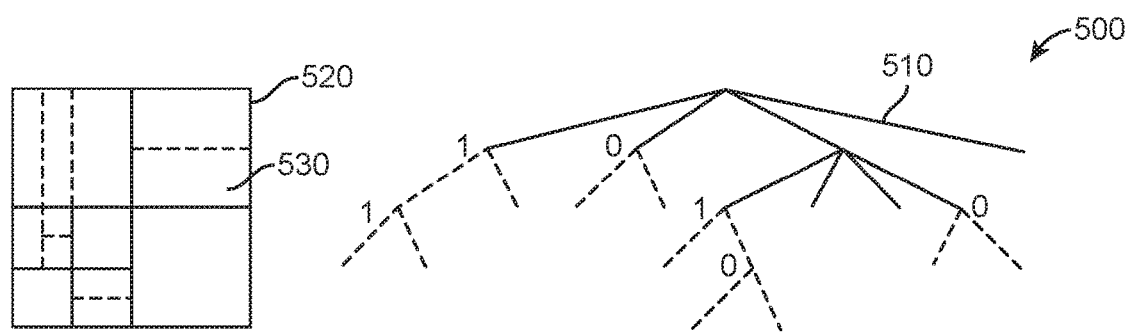
FIG. 5 illustrates a CTU in accordance with the QTBT tool.

The Quad-Tree plus Binary-Tree (QTBT) coding tool (Document JVET-C1001_v3, entitled "Algorithm Description of Joint Exploration Test Model 3", Joint Video Exploration Team of ISO/IEC JTC1/SC29/WG11, 3rd meeting, 26 May-1 Jun. 2015, Geneva, CH) is a new video coding tool that provides a more flexible CTU representation and increased compression efficiency compared to the CU/PU/TU arrangement of the HEVC standard. As illustrated in FIG. 5, the Quad-Tree plus Binary-Tree (QTBT) coding tool defines a coding tree 510 where coding units can be split both in a quad-tree and in a binary-tree fashion. An exemplary coding tree representation of a Coding Tree Unit 520 is illustrated in FIG. 5, where solid lines indicate quad-tree partitioning and dotted lines indicate binary partitioning of a CU 530 within CTU 520, which is spatially embedded in the quad-tree leaves.

The splitting of a CTU into coding units is decided on the encoder side, e.g. through a rate distortion optimization procedure which consists in determining the QTBT representation of the CTU with minimal rate distortion cost. In the QTBT representation, a CU has either a square or a rectangular shape. The size of a coding unit is always a power of 2, and typically goes from 4 to 128. The QTBT decomposition of a CTU comprises two stages: the CTU is first split into 4 CUs in a quad-tree fashion, then each quad-tree leaf can be further divided into two CUs in a binary fashion or into 4 CUs in a quad-tree fashion, as illustrated in FIG. 3.

With the QTBT representation, a CU may not be further partitioned into PUs or TUs. In other words, each CU is considered as a single prediction unit and a single transform unit and such a QTBT representation only allows for symmetric splitting of a CU. More recently, however, CUs with new rectangular shapes which result from a new Binary Splitting Mode called asymmetric splitting mode.

The present disclosure is directed to Illumination Compensation (IC). In Inter mode, IC allows correcting block prediction samples obtained via Motion Compensation (MC) by considering any spatial or temporal local illumination variation. In the prior art the IC parameters may be estimated by comparing an L-shaped set of reconstructed neighboring samples for a current block in a picture with the corresponding L-shaped set of neighboring samples for a reference block. In the case of bi-prediction, the corresponding L-shaped set of neighboring samples for two reference-i blocks (i=0 or 1) may be separately compared to the L-shaped set of reconstructed neighboring samples for the current block.

Figure 6:
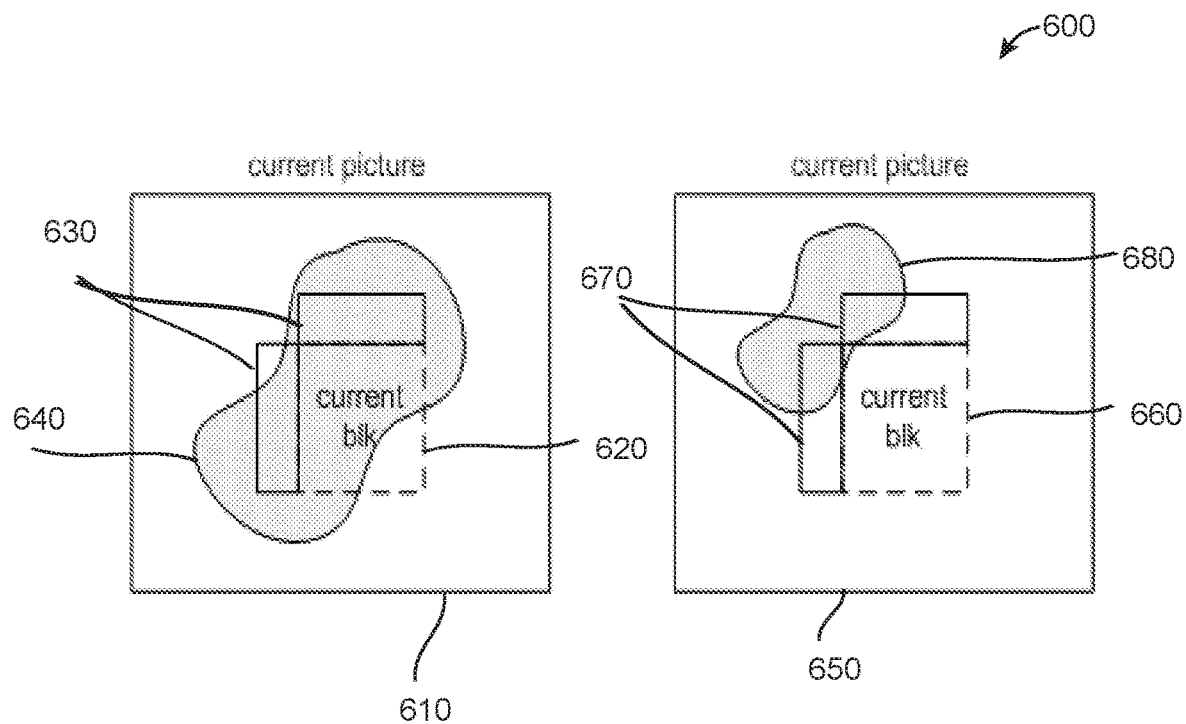
FIG. 6 illustrates two exemplary current pictures in accordance with the prior art.

According to the prior art, the idea of utilizing the L-shaped sets of reconstructed neighboring samples relies on the assumption that the actual IC parameters, which are optimized for the neighboring samples, remain suited for the current block. The assumption is true in general since the neighboring samples of the L-shape are the closest available reconstructed samples to the current block samples. However, one limitation of this approach is encountered if some of the neighboring samples belong to different objects than the current block. FIG. 6 illustrates two examples 600 of current pictures (610, 650) with respective current blocks (620, 660) and L-shaped sets (630, 670) of reconstructed neighboring samples and their relations to objects (640, 680) in the current pictures (610, 650), in accordance with the prior art. It may be observed that in current picture 610, the object 640 encompasses large sections of the L-shaped set 630 and of the current block 620. On the other hand, in current picture 650, the object 680 only encompasses the L-shaped set 670 and hardly includes any section of the current block 660. Hence, in the case of current block 660, the samples of the L-shaped set 670 may not be well-suited for estimating the IC parameters for the current block 660.

The present disclosure addresses some disadvantages present in the prior art. In particular at least some embodiments of the present disclosure do not utilize the L-shaped set of reconstructed neighboring samples in estimating the IC parameters. Instead, in at least some embodiments of the present disclosure, the IC parameters are derived from sets of reconstructed samples of the reference blocks (e.g., 120, 125) associated with a current block (e.g., 160), as will be further described in the following paragraphs and figures. Moreover, in at least some embodiments of the present disclosure, the IC parameters used in bi-prediction, ($a_0$, $b_0$) and ($a_1$, $b_1$), are jointly derived, as will be further described in the following paragraphs and figures.

Encoding

Figure 7:
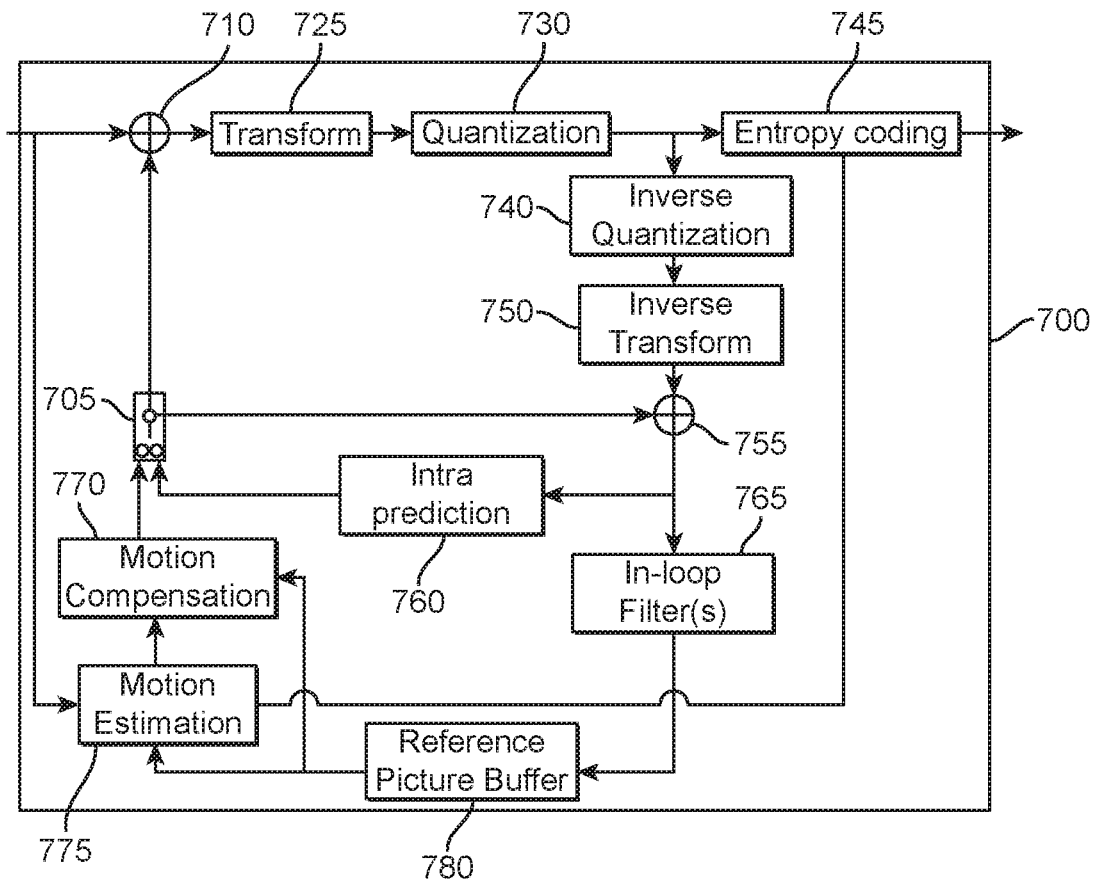
FIG. 7 illustrates a simplified block diagram of an exemplary video encoder in accordance with an embodiment of the present disclosure.

FIG. 7 illustrates a simplified block diagram of exemplary video encoder 700 in accordance with an embodiment of the present disclosure. The encoder 700 may be included in a transmitter or headend in a communication system. To encode a video sequence with one or more pictures, a picture may be partitioned into CTUs of square shape with a configurable size. A consecutive set of CTUs may be grouped into a slice. A CTU is the root of a QTBT partitioning into CUs. In the exemplary encoder 700, a picture is encoded by the encoder modules as described below. Each block is encoded using either an intra mode or inter mode. When a block is encoded in an intra mode, the encoder 700 performs intra prediction (module 760) or spatial prediction, based on at least one block in the same picture or frame. When a block is encoded in an inter mode, the encoder 700 performs inter prediction or temporal prediction, based on at least one reference block from at least one reference picture or frame. In uni inter-prediction, the prediction may be generally (but not necessarily) based on an earlier reference picture or frame. In bi inter-prediction, the prediction may be generally (but not necessarily) based on an earlier and a later picture or frame. In an inter mode, motion estimation (module 775) and compensation (module 770) are performed. The encoder decides (module 705) which one of the intra mode or inter mode to use for encoding the block, and indicates the intra/inter decision by a prediction mode flag. Residuals are calculated by subtracting (module 710) a predicted sample block (also known as a predictor) from the original image block.

As an example, blocks in intra mode are predicted from reconstructed neighboring samples. Inter prediction is performed by performing motion estimation (module 775) and motion-compensating (in module 770) a reference block stored in a reference picture buffer 780.

The residuals are transformed (module 725) and quantized (module 730). The transform module 725 may transform the image from the pixel or time domain to the transform or frequency domain. The transform may be may be, e.g., a cosine transform, a sine transform, a wavelet transform, etc. Quantization may be performed according to, e.g., a rate distortion criterion. The quantized transform coefficients, as well as motion vectors and other syntax elements, are entropy coded (module 745) to output a bitstream. The entropy coding may be, e.g., Context Adaptive Binary Arithmetic Coding (CABAC), Context Adaptive Variable Length Coding (CAVLC), Huffman, arithmetic, exp-Golomb, etc. The encoder may also skip the transform and apply quantization directly to the non-transformed residual signal. The encoder may also bypass both transform and quantization, i.e., the residual is coded directly without the application of the transform or quantization process. In direct PCM coding, no prediction is applied and the block samples are directly coded into the bitstream.

The encoder comprises a decoding loop and thus decodes an encoded block to provide a reference for further predictions. The quantized transform coefficients are de-quantized (module 740) and inverse transformed (module 750) to decode residuals. An image block is reconstructed by combining (module 755) the decoded residuals and the predicted sample block. An in-loop filter (765) may be applied to the reconstructed picture, for example, to perform deblocking/Sample Adaptive Offset (SAO) filtering to reduce coding artifacts. The filtered image is stored in the reference picture buffer 780.

The modules of video encoder 700 may be implemented in software and executed by a processor, or may be implemented using circuit components well-known by one skilled in the art of compression. In particular, video encoder 700 may be implemented as an integrated circuit (IC).

The modules of video encoder 700 are also present in other video encoders (e.g., HEVC encoders), except for the differences described in the present disclosure, particularly, differences in modules motion compensation 770 and/or motion estimation 775 based on illumination compensation, as will be described in greater detail in the following paragraphs and figures. For functionalities other than illumination compensation (e.g., modules other than 770 and 775), video encoder 700 may be similar to an HEVC video encoder and the functionalities are not herein described in detail.

The motion estimation module 775 may include motion compensation since its purpose is to determine the best motion vectors which may use an iterative search that typically terminates when the rate-distortion cost (RD cost) is low enough, or has reached a minimum. As a result, IC may also be applied in the motion estimation module 775.

Figure 8:
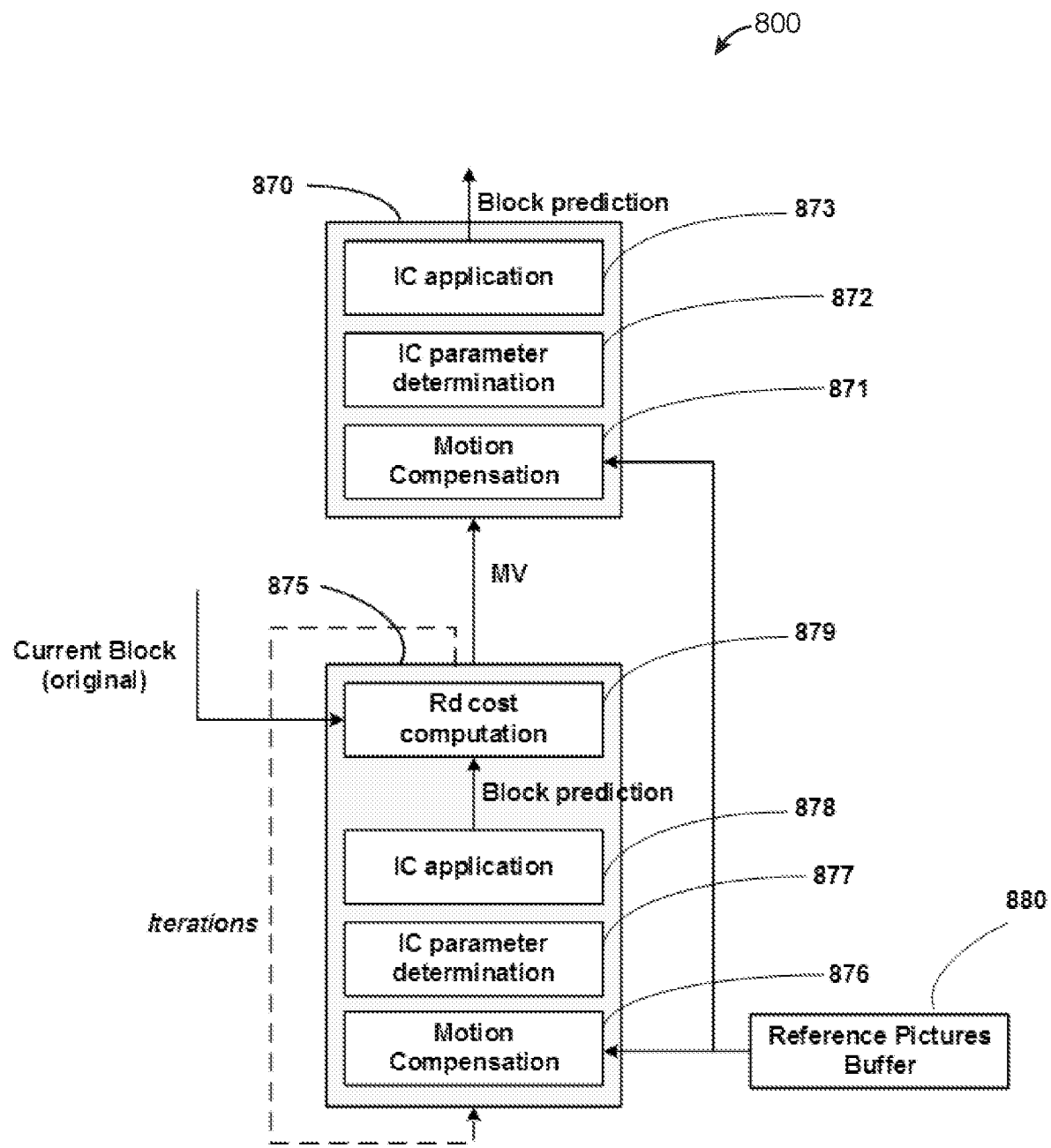
FIG. 8 illustrates a simplified block diagram of some modules of an exemplary video encoder in accordance with an embodiment of the present disclosure.

FIG. 8 illustrates a simplified block diagram 800 of some modules of an exemplary video encoder in accordance with an embodiment of the present disclosure. The modules reference picture buffer 880, motion estimation 875 and motion compensation 870 are similar to respective modules 780, 775 and 770 of FIG. 7 and specify the IC related functionalities within the modules for a video encoder in accordance with an embodiment of the present disclosure. Motion compensation 870 may include an internal motion compensation module 871 which may perform similar functionalities to prior art modules for motion compensation, as well-known by persons skilled in the art of compression. In particular, module 871 may generate motion compensated reference blocks used for IC (e.g., ref-0, ref-1) and predictions (e.g., pred0, pred1), which may have the same or different resolutions, as previously explained. Moreover, module 870 may include an IC parameter determination module 872 which determines the IC parameters in accordance with the present disclosure. Finally, module 870 may include an IC application module 873 in accordance with the present disclosure. Module 873 may implement a similar functionality to step 240 and/or step 245.

As previously mentioned, the motion estimation module 875 may include motion compensation since its purpose is to determine the best motion vectors which may use an iterative search that typically terminates when the rate-distortion cost (RD cost) is low enough, or has reached a minimum. The iteration tests different motion vector candidates. Modules 876-878 may be similar to modules 871-873, respectively. Therefore, motion estimation 875 may include a specific motion compensation module 876 which may perform similar functionalities to prior art modules for motion compensation, as well-known by persons skilled in the art of compression. In particular, module 876 may generate motion compensated reference blocks used for IC (e.g., ref-0, ref-1) and predictions (e.g., pred0, pred1), which may have the same or different resolutions, as previously explained. Moreover, module 875 may include an IC parameter determination module 876 which determines the IC parameters in accordance with the present disclosure. Also, module 875 may include an IC application module 878 in accordance with the present disclosure. Module 878 may implement a similar functionality to step 240 and/or step 245. Finally, module 875 include an RD cost computation module 879 that determines the RD cost and establishes whether a suitable value or a minimum value of RD has been achieved in order to provide the best motion vector to the motion compensation module 870. In one embodiment, motion estimation module 875 may also output the IC parameters associated with the best motion vector. In that case, IC parameters do not need to be re-calculated and module 872 can be skipped from motion/illumination compensation module 870.

The modules in FIG. 8 based on illumination compensation will be described in greater detail in the following paragraphs and figures.

In one embodiment in accordance with the present disclosure, IC may be enabled or disabled adaptively for each inter-mode coded coding unit (CU) of a picture. In the bitstream, when IC is enabled for a current slice/picture or sequence, an IC flag may be encoded per block to indicate whether IC is enabled for the block or not. The IC flag may then be retrieved at the video decoder. In one embodiment, when the derived IC parameters do not result in improvement of the prediction, then IC may be locally or globally deactivated (e.g., the IC flag being set to false). In one embodiment, when the IC flag enables IC (e.g., the IC flag is set to true) for a block, the IC parameters for the block may be included and optionally encoded in the bitstream, to be retrieved at the decoder.

Decoding

Figure 9:
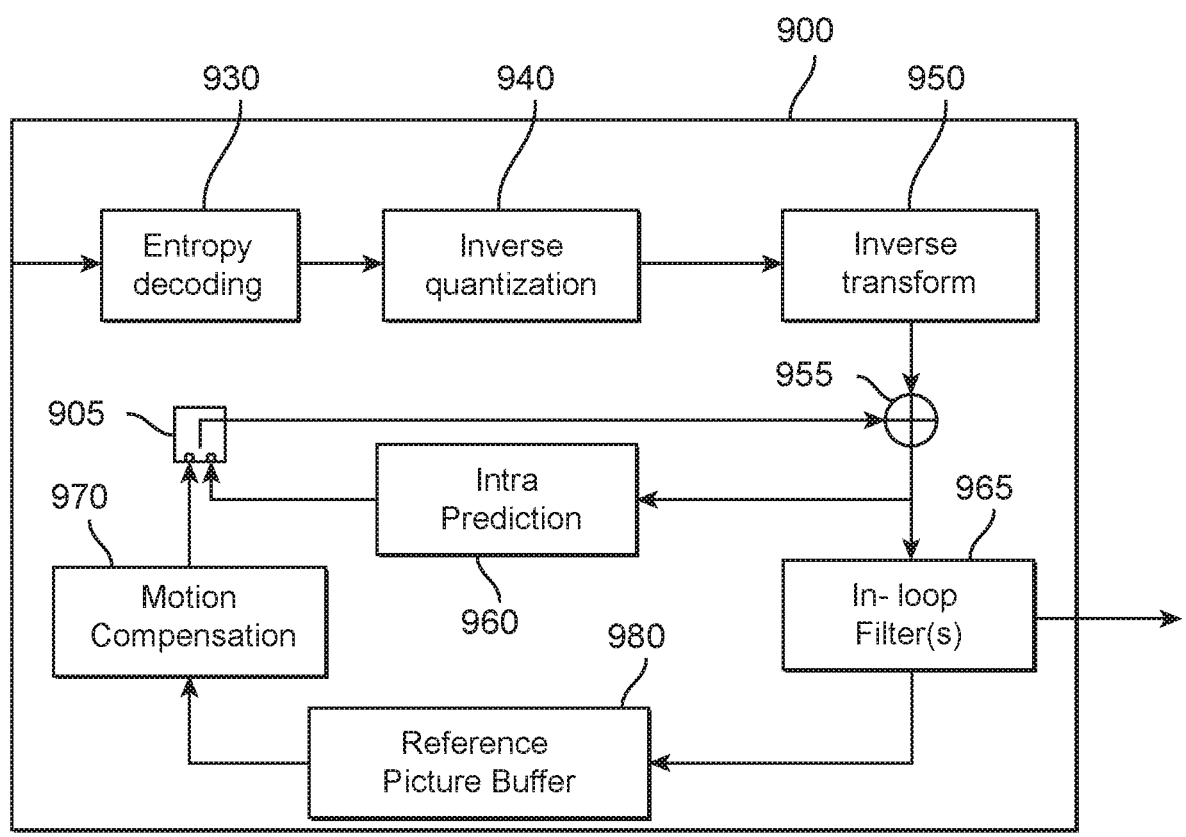
FIG. 9 illustrates a simplified block diagram of an exemplary video decoder in accordance with an embodiment of the present disclosure.

FIG. 9 illustrates a simplified block diagram of an exemplary video decoder 900 in accordance with an embodiment of the present disclosure. The video decoder 900 may be included in a receiver in a communication system. Video decoder 900 generally performs a decoding pass reciprocal to the encoding pass performed by the video encoder 700 as described in FIG. 7, although not all operations in the decoder are inverse operations of the encoding process (e.g., intra and inter prediction). In particular the input of the decoder 900 includes a video bitstream, which may be generated by the video encoder 700. The bitstream is first entropy decoded (module 930) to obtain transform coefficients, motion vectors, syntax elements and other coded information. The transform coefficients are de-quantized (module 940) and inverse transformed (module 950) to decode residuals. The decoded residuals are then combined (module 955) with a predicted sample block (also known as a predictor) to obtain a decoded/reconstructed image block. The encoder decides (e.g., module 705) which one of the intra mode or inter mode to use for encoding the block, and indicates the intra/inter decision by a prediction mode flag. The predicted sample block may be obtained (module 905) from intra prediction (module 960) or motion-compensated prediction (i.e., inter prediction) (module 970). An in-loop filter (module 965) may be applied to the reconstructed image. The in-loop filter may comprise a deblocking filter and a SAO filter. The filtered image is stored in a reference picture buffer 980.

The modules of video decoder 900 may be implemented in software and executed by a processor, or may be implemented using circuit components well-known by one skilled in the art of compression. In particular, video encoder 900 may be implemented as an integrated circuit (IC), alone or combined with video decoder 700 as a codec.

The modules of video decoder 900 are also present in other video decoders (e.g., HEVC decoders), except for the differences described in the present disclosure, particularly, differences in motion compensation module 970 based on illumination compensation as in module 770 of FIG. 7 according to the present disclosure, and as will be described in greater detail in the following paragraphs and figures. For functionalities other than illumination compensation (e.g., modules other than 970), video decoder 900 may be similar to an HEVC video decoder and the functionalities are not herein described in detail.

Figure 10:
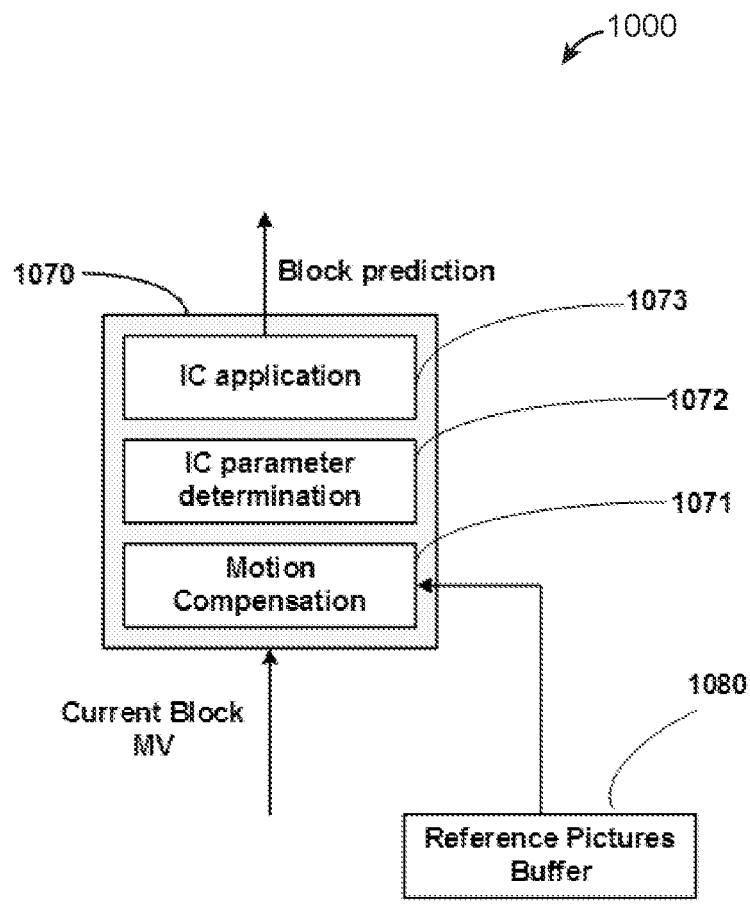
FIG. 10 illustrates a simplified block diagram of some modules of an exemplary video encoder in accordance with an embodiment of the present disclosure.

FIG. 10 illustrates a simplified block diagram 1000 of some modules of an exemplary video decoder in accordance with an embodiment of the present disclosure. The modules reference picture buffer 1080 and motion compensation 1070 are similar to respective modules 980 and 970 of FIG.

9. Module 1070 illustrates the IC related functionalities within the module for a video decoder in accordance with an embodiment of the present disclosure. Motion compensation 1070 may include an internal motion compensation module 1071 which may perform similar functionalities to prior art modules for motion compensation, as well-known by persons skilled in the art of compression. In particular, module 871 may generate motion compensated reference blocks used for IC (e.g., ref-0, ref-1) and predictions (e.g., pred0, pred1), which may have the same or different resolutions, as previously explained. Moreover, module 1070 may include an IC parameter determination module 1072 which determines the IC parameters in accordance with the present disclosure. Finally, module 1070 may include an IC application module 1073 in accordance with the present disclosure. Module 1073 may be similar to module 873 and implement a similar functionality to step 240 and/or step 245. The modules in FIG. 10 based on illumination compensation will be described in greater detail in the following paragraphs and figures. It is to be understood that module 1070 is also similar of module 870 of FIG. 8, since the same functionality exists in both the video encoder and decoder.

In one embodiment in accordance with the present disclosure, IC may be enabled or disabled adaptively for each inter-mode coded coding unit (CU) of a picture. In the bitstream, when IC is enabled for a current slice/picture or sequence, an IC flag may be encoded per block to indicate whether IC is enabled for the block or not. Alternately, the IC flag may be inferred, e.g., it may be derived from previously encoded blocks using a merge mode. The IC flag is then retrieved at the video decoder. In cases where the derived IC parameters do not result in improvement of the prediction, then IC may be locally or globally deactivated (e.g., the IC flag being set to false). When the IC flag enables IC (e.g., the IC flag is set to true) for a block, the IC parameters for the block may be included and optionally encoded in the bitstream, to be retrieved at the decoder.

It is to be understood that when the IC flag and IC parameters are included and optionally encoded in the bitstream, the module IC parameter determination 1071 retrieves the IC flags and IC parameters from the bitstream instead of calculating or deriving the IC parameters.

In the following, embodiments are described for derivation or computation of the IC parameters in accordance with the present disclosure.

In one embodiment according to the present disclosure, in the case of bi-prediction, the IC parameters may be jointly derived or computed from the two motion compensated blocks reference 0 (ref-0 or MC-0) and reference 1 (ref-1 or MC-1) (e.g., 110 and 115, respectively). In this case, L-shaped sets of reconstructed neighboring samples for the current block, the reference 0 block and the reference 1 block are not utilized in the computation. Similarly, samples in the current block are not utilized in the computation (since they are not available at the decoder side). The computation is only based on a set of samples in the ref-0 and a set of samples in the ref-1 blocks. The set of samples may include the entire ref-0 and ref-1 blocks or just a section of the ref-0 and ref-1 blocks, respectively.

Figure 11:
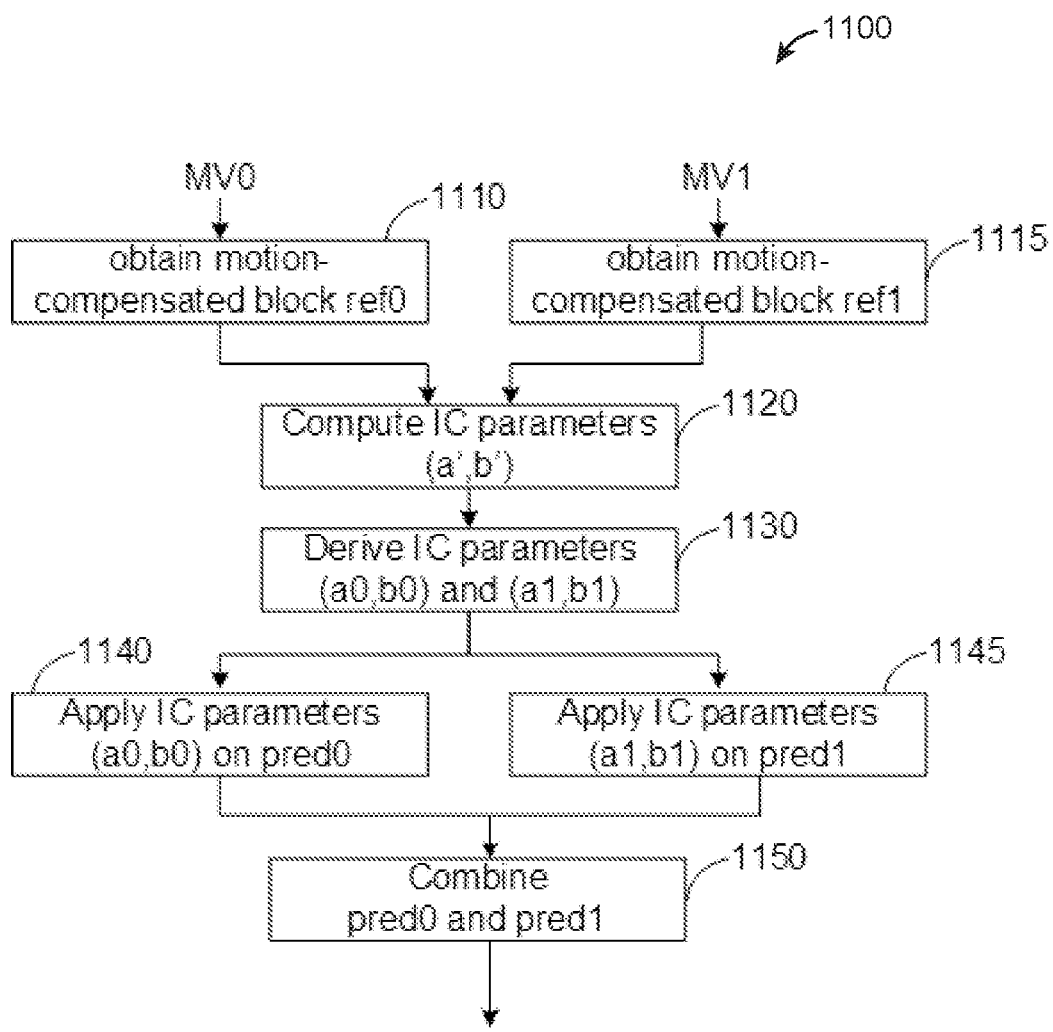
FIG. 11 illustrates a flowchart of a method of generating block predictions in bi-prediction mode based on illumination compensation in accordance with an embodiment of the present disclosure.

FIG. 11 illustrates a flowchart 1100 of a method of generating block predictions in bi-prediction mode based on illumination compensation in accordance with an embodiment of the present disclosure. Initially, at steps 1110 and 1115, MV0 and MV1 are used to obtain the motion compensated blocks ref-0 and ref-1 in reference frames of List-0 and List-1, respectively. As previously described ref-0 and ref-1 may be similar to the predictions pred0 and pred1, respectively, unless simplifications are used, e.g., using a lower resolution. For example, in this case, the MC may be performed e.g., using a full-pel resolution (or an integer part of the MV) instead of sub-pel used for predictions, so that interpolation MC filters are not applied and the computation load is reduced.

Next, at step 1120, the IC parameters (a', b') between ref-1 and ref-0 are computed or determined based on samples of the block ref-1 125 and the block ref-0 120 as follows:

$$(a', b') = \underset{a,b}{\operatorname{argmin}} \left\{ \sum\nolimits_{x0,x1} (ax_0 + b - x_1)^2 \right\} \quad (4)$$

where $x_0$ and $x_1$ are the samples for ref-0 and ref-1, respectively, and the summation is over samples $x_0$ in ref-0 paired with corresponding samples $x_1$ in ref-1. Note that equation 4 is a least squares computation similar to equation 2. However, equation 4 uses samples of ref-0 120 and ref-1 125 instead of the L-shaped sets of reconstructed neighboring samples for the current block and the desired reference block (170, 130, 135). The samples of ref-0 and ref-1 to be used may include all samples of each block or a subset of samples of each block. Any reference picture of the current picture may be chosen as reference 0 or reference 1 interchangeably.

At step 1130, the IC parameters ($a_0$, $b_0$) which compensate illumination between block ref-0 and the current block, and the IC parameters ($a_1$, $b_1$) which compensate illumination between block ref-1 and the current block are both derived from (a', b').

In one embodiment, values of ($a_0$, $b_0$) and ($a_1$, $b_1$) may be determined so that they minimize the sum of absolute differences $|a_0 * x_0 + b_0 - a_1 * x_1 - b_1|$ for all the pairs of samples ($x_0$, $x_1$), where $x_0$ and $x_1$ are the samples for ref-0 and ref-1. Hence, the following approximation is adopted:

$$a_0 * x_0 + b_0 \approx a_1 * x_1 + b_1 \quad (5)$$

Given that one has computed (a', b') which minimizes the sum of square differences at step 1120, the following approximation is utilized:

$$x_1 \approx a' * x_0 + b' \quad (6)$$

From equations 5 and 6, one may derive the following approximation that should be verified for all the values $x_0$:

$$a_0 * x_0 + b_0 \approx a_1 * a' * x_0 + * b' + b_1 \quad (7)$$

One obvious solution satisfies the following equalities:

$$\begin{cases} a_1 * a' = a_0 \\ a_1 * b' + b_1 = b_0 \end{cases} \quad (8)$$

Also, one can assume that the values $a_0$, $a_1$, $b_0$, $b_1$, are linear functions of the temporal distance of the current frame to the corresponding reference frame. Let's denote a the relative temporal distance of current picture ($poc_{cur}$) to the reference frame ($poc_0$, $poc_1$), as follows:

$$a = (poc_{cur} - poc_0)/(poc_1 - poc_0) \quad (9)$$

From equation 9, one may observe that:

$$\begin{cases} \text{when } \alpha = 0, \text{ then } a_0 = 1 \text{ and } b_0 = 0 => a_1 = 1/a' \text{ and } b_1 = -b'/a' \\ \text{when } \alpha = 1, \text{ then } a_1 = 1 \text{ and } b_1 = 0 => a_0 = a' \text{ and } b_0 = b' \end{cases} \quad (10)$$

Assuming $a_0$, $a_1$, $b_0$, $b_1$, are linear functions of $\alpha$:

$$\begin{cases} a_0 = K_1 * \alpha + D_1 \\ b_0 = K_2 * \alpha + D_2 \\ a_1 = K_3 * \alpha + D_3 \\ b_1 = K_4 * \alpha + D_4 \end{cases} \quad (11)$$

From equations 8, 10 and 11, the following may be derived:

$$\begin{cases} a_0 = a' * \alpha + (1 - \alpha) \\ b_0 = \alpha * b' \\ a_1 = \alpha + (1 - \alpha)/a' \\ b_1 = -b' * (1 - \alpha)/a' \end{cases} \quad (12)$$

It is to be understood that in equation 12, the variables may be floating point numbers or may be transformed (e.g., re-scaled) so that $a_0$, $a_1$, $b_0$, $b_1$ are represented as rational numbers (numerator and divisor, or numerator and power of two divisor) to simplify the complexity.

Then, at steps 1140 and 1145, the IC parameters ($a_0$, $b_0$) and ($a_1$, $b_1$) are applied to their respective predictions, pred0 and pred1. Finally, the predictions pred0 and pred1 are combined at step 1150. It is to be understood that steps 1140, 1145 and 1150 are similar to steps 240, 245 and 250 of FIG. 2, respectively, therefore, not herein described in detail. Steps 1110 and 1115 obtain ref-0 and ref-1, respectively. Steps 230 and 235 are not included in FIG. 11 but it is understood that pred0 and pred1 computations may take place outside the method 1100 and prior to applying the IC parameters to their respective predictions. The generation of ref-0, ref-1, pred0 and/or pred1 may happen as previously described in association with modules 871, 878 and 1071.

Figure 12:
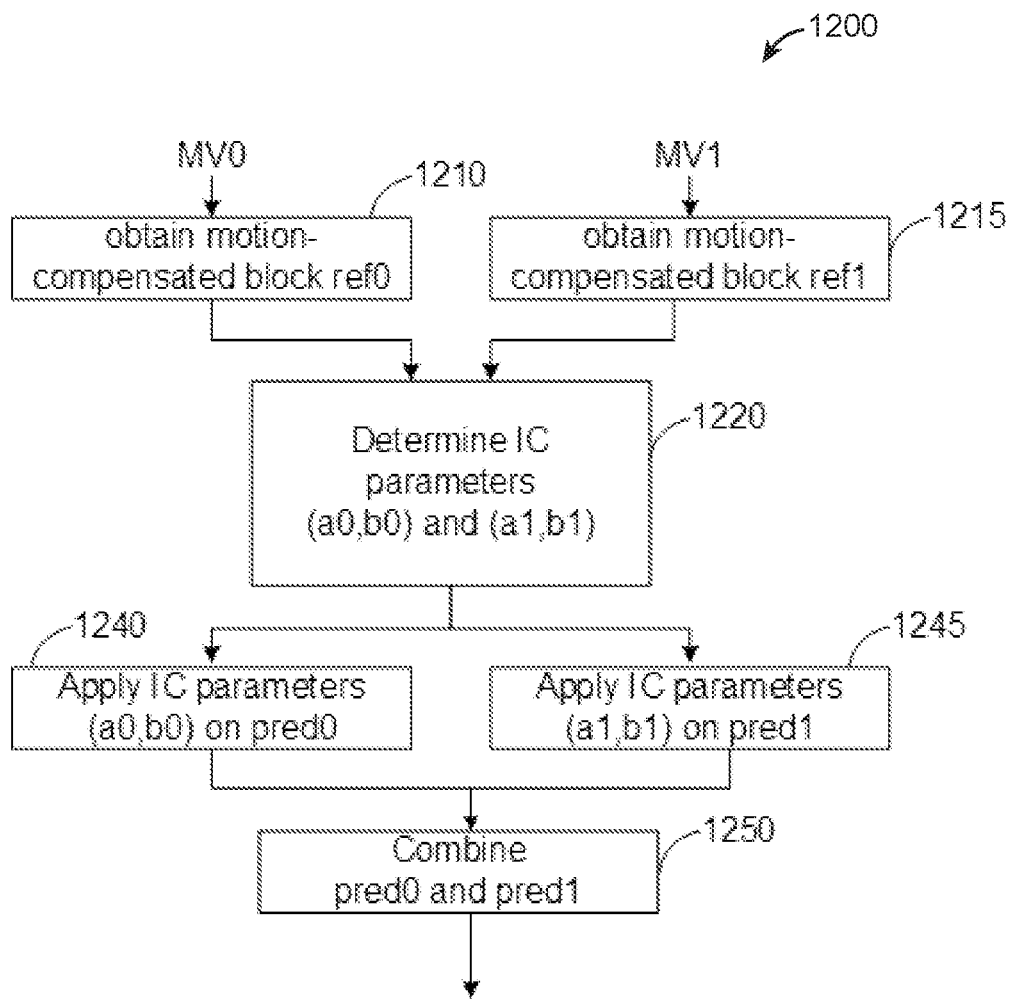
FIG. 12 illustrates a flowchart of a method of generating block predictions in bi-prediction mode based on illumination compensation in accordance with an embodiment of the present disclosure.

FIG. 12 illustrates a flowchart 1200 of a method of generating block predictions in bi-prediction mode based on illumination compensation in accordance with an embodiment of the present disclosure. Steps 1210, 1215, 1240, 1245 and 1250 are similar to steps 1110, 1115, 1140, 1145 and 1150 of FIG. 11, respectively, therefore, not herein described.

At step 1220, the optimum values ($a_0'$, $b_0'$, $b_1'$) of ($a_0$, $b_0$) and ($a_1$, $b_1$) may be directly derived from the samples of ref-0 120 and ref-1 125 using a least square method, as in:

$$\{a_0', b_0', a_1', b_1'\} = \underset{a0,b0,a1,b1}{\operatorname{argmin}} \left\{ \sum_{x0,x1} (a_0 x_0 + b_0 - a_1 x_1 - b_1)^2 \right\} \quad (13)$$

For either method 1100 or method 1200 in accordance with the present disclosure, additional embodiments apply, as described in detail in the following paragraphs and figures.

Figure 2:
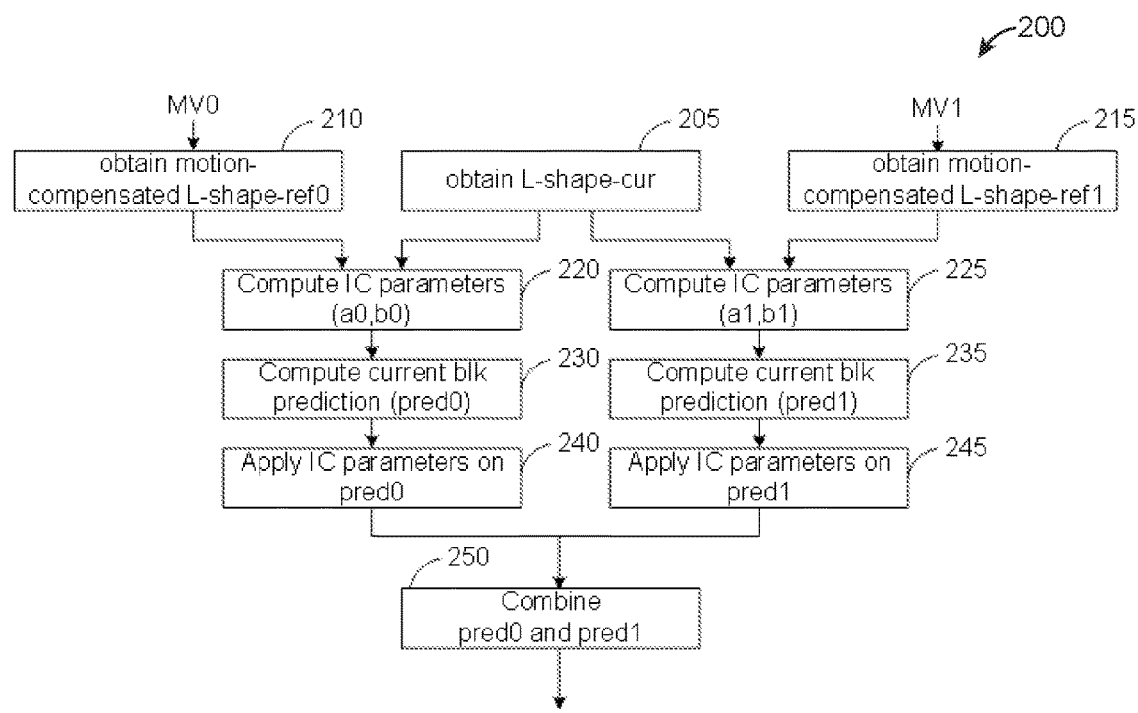
FIG. 2 illustrates a flowchart of a method of generating block predictions in bi-prediction mode based on illumination compensation in accordance with the prior art.

In one embodiment, other more elaborate combinations than the one described for step 240 of FIG. 2 may be applied at steps 1150 or 1250, e.g., by applying weights to the values of pred0 and pred1. However, in this case, the weights are determined and constant for a whole slice of a picture.

In one embodiment, a flag may be included and optionally encoded in the bitstream to indicate whether IC (bi or unidirectional) is enabled/disabled for at least one of the current picture, slice or block. IC may be disabled when there is no obvious illumination change between a current picture and its reference pictures. At the encoder, the IC flag may be determined, e.g., by comparing the histogram of the reference frames and the current frame. If the histogram difference between the current picture, slice or block and every reference picture of the current picture is smaller than a given value or threshold, IC is disabled for the current picture, slice or block; otherwise, IC is enabled for the current picture, slice or block.

In one embodiment, if MC is performed using integer motion vector (or full-pel resolution), then the last used IC parameters and/or MVs used for each reference indexes are stored. If the current MVs and/or reference indexes are equal (or substantially equal) to last MVs and reference indexes used at last computation of IC parameters, then the IC parameters may be re-used. This store and compare embodiment is particularly useful at the encoder, where the derivation of IC parameter derivation (e.g., call to a routine or function in software) happens numerous times at motion estimation and mode selection during Rate Distortion Optimization (RDO). This embodiment therefore results in less complexity and speeds up the process. Being approximately or substantially equal may mean a having a value within a ±5% (or ±10%) deviation or margin from the last value.

In one embodiment, IC may be enabled/disabled at block, slice and/or picture level depending on the number of uses of IC in previous reference pictures. For example, if the number of slices within reference pictures, or blocks within reference pictures, or samples within the blocks of reference pictures using IC (i.e., for which IC is enabled) is inferior to a threshold or level, then IC is not used in the current picture. In one embodiment, the "number" may be replaced by a "percentage number", that is, the relative number versus corresponding picture number of slices, blocks or samples, respectively. This number of uses embodiment therefore results in less complexity and speeds up the process. In one embodiment, one may consider determining the "number" based on N reference pictures (e.g., N=1 for Low-Delay, N=2 for Hierarchical Random Access, etc.) with the closest POC to the current POC. The "number" may be averaged, weighted averaged, the sum, the minimum or the maximum of the numbers of the reference pictures.

In some codecs, IC may be performed at the decoder in the process for deriving the motion vectors, e.g., in the coding mode Frame Rate-Up Conversion (FRUC), described in the document "Algorithm Description of Joint Exploration Test Model 6 (JEM 6)" of the Joint Video Exploration Team (JVET) of ITU-T SG 16 WP 3 and ISO/IEC JTC 1/SC 29/WG 11, document number JVET-F1001 v3, 6$^{th}$ meeting, Hobart, AU, Mar. 31-Apr. 7, 2017. FRUC is a coding mode where the motion vectors are not coded but derived at decoder side.

Figure 13:
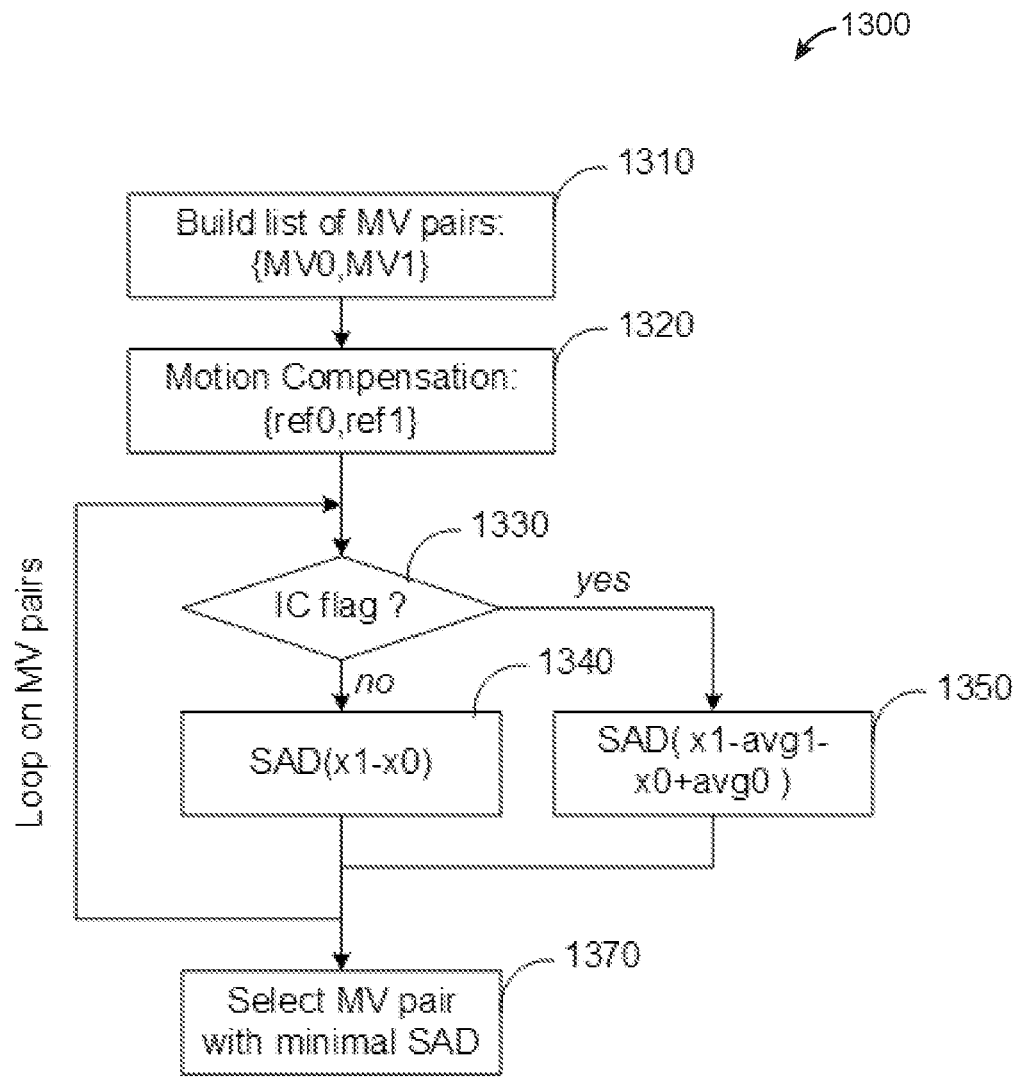
FIG. 13 illustrates a flowchart of a method of selecting a best motion vector pair in accordance with the prior art.

FIG. 13 illustrates a flowchart of a method 1300 of selecting a best motion vector pair in accordance with the prior art. In FRUC mode, in case of Bi-Prediction (Bilateral matching mode), a list of pairs of MV candidates (list of {$MV_0$, $MV_1$}) is built at step 1310 and, at step 1370, the decoder selects the MV pair (best MV pair) which minimizes the sum of absolute differences, SAD, between the two motion compensated reference blocks (ref-0 and ref-1) as follows:

$$SAD(MV_0, MV_1) = \Sigma_{x_0, x_1} |(x_0 - x_1)| \quad (14)$$

where $x_0$ and $x_1$ are the samples for ref-0 and ref-1, respectively (obtained in 1320 from $MV_0$ and $MV_1$).

Therefore, the best MV pair is given by:

$$\text{best\_MV\_pair} = \underset{MV_0, MV_1}{\operatorname{argmin}} \{SAD(MV_0, MV_1)\} \quad (15)$$

The IC flag is checked at step 1330. When IC is disabled, then the SAD is performed according to equation 14 at step 1340. When IC is enabled, the SAD is modified so that average sample values of the blocks ref-0 and ref-1 are subtracted or removed from the respective samples $x_0$ and $x_1$ at step 1350. Hence, $x_0$ is replaced by $x_0-avg_0$ and $x_1$ is replaced by $x_1-avg_1$ as follows:

$$SAD(MV_0,MV_1)=\Sigma_{x_0,x_1}|(x_0-avg_0-x_1+avg_1)| \quad (16)$$

Figure 14:
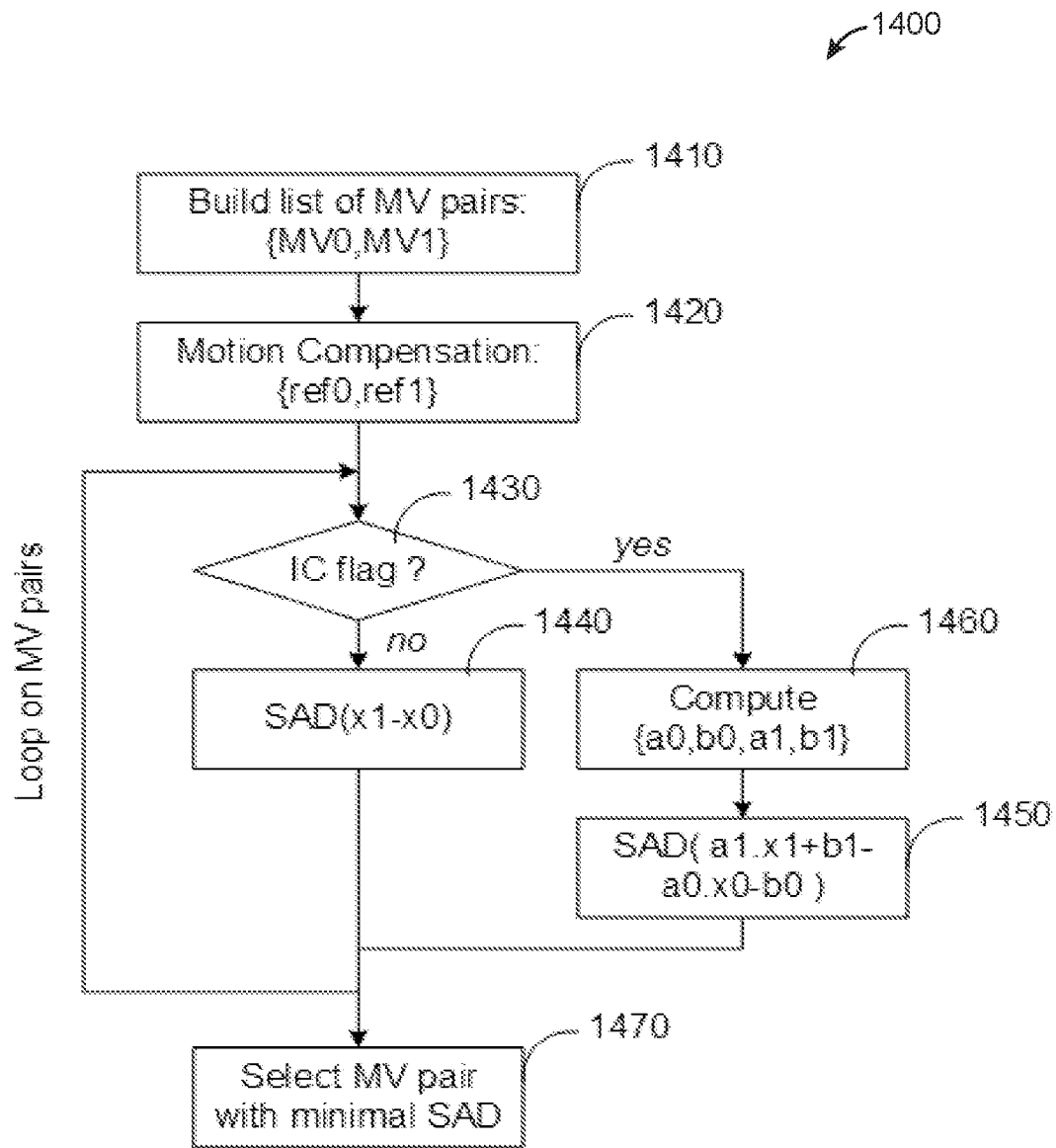
FIG. 14 illustrates a flowchart of a method of selecting a best motion vector pair based on illumination compensation in accordance with an embodiment of the present disclosure.

FIG. 14 illustrates a flowchart of a method 1400 of selecting a best motion vector pair based on illumination compensation in accordance with an embodiment of the present disclosure. Steps 1410, 1420, 1430 1440 and 1470 are similar to respective steps 1310, 1320, 1330 1340 and 1370 in FIG. 13. In the present embodiment, IC parameters ($a_0$, $b_0$, $a_1$, $b_1$) determined according to any of the embodiments of the present disclosure, at step 1460, are applied to the respective samples $x_0$ and $x_1$ before computing the SAD at step 1450, as follows:

$$SAD(MV_0,MV_1)=\Sigma_{x_0,x_1}|a_0*x_0+b_0-a_1*x_1-b_1| \quad (17)$$

Finally, the best MV pair with minimal SAD is selected, at step 1470.

In one embodiment, when in FRUC mode, a list of MV candidates (LC) is built. In the case of bi-prediction (bilateral mode), one of the candidate is built by deriving a pair of MVs with rescaling. The sum of absolute differences, SAD, between the two motion compensated reference blocks with this pair of MVs is computed, and the best candidate will be the one with minimal SAD. If the IC flag is true (IC-flag being coded for FRUC, or it could be inferred), the calculation of the SAD is modified to include IC according to the various embodiments of this disclosure.

In one embodiment, one computes the IC parameters according to any of the embodiments of present disclosure (using MC reference blocks, herein called $IC_{blocks}$) and also according to the prior art (FIG. 1 and equations 1-2, that is, using MC of reference L-shapes and the current L-shape, herein called $IC_{L-shapes}$). The decoder/encoder chooses the best IC parameters to use (between $IC_{blocks}$ and $IC_{L-shapes}$). The choice may be based on one of:

a. The IC parameters which minimize the absolute difference value: $|a_0*+b_0-a_1*\overline{x_1}-b_1|0$ where $\overline{x_0}$, $\overline{x_1}$ are the average sample values of the MC reference blocks ref-0 and ref-1, respectively.

b. The IC parameters which minimize the absolute difference value: $|a_0*\overline{x_0}+b_0-a_1*\overline{x_1}-b_1|$ where $\overline{x_0}$, $\overline{x_1}$ are set to $2^{(bitDepth-1)}$.

c. The IC parameters which minimize the following SAD:

$$SAD=\Sigma_{x_0,x_1}|a_0*x_0+b_0-a_1*x_1-b_1| \quad (18)$$

In case $IC_{L-shapes}$, is not applicable (e.g., a=0, $poc_0=poc_1$, etc.) or enabled, then the choice of the best IC parameters defaults to $IC_{blocks}$.

It is to be understood that when $IC_{block}$ is enabled, a selection is performed according to one of the rules in items a, b and c above. Otherwise, $IC_{L-shape}$ is selected by default.

In one embodiment, $IC_{block}$ is disabled depending on the current block size, e.g., if the current block size is less than or equal to a threshold or level. For example, if min (width,height) is less than or equal to 8 then $IC_{L-shape}$ is selected by default. Otherwise, if both width and height are strictly greater than 8, then $IC_{block}$ is enabled.

In one embodiment, $IC_{block}$ is enabled when the picture order count is such that:

d. $poc_0 < poc_{curr} < poc_1$ or $poc_1 < poc_{curr} < poc_0$.

e. $|poc_0-poc_1| < C*|poc_{curr}-poc_0|$ or $|poc_0-poc_1| < C*|poc_{curr}-poc_1|$, where C is a threshold or factor.

f $(poc_0-poc_{curr})*MV_1=(poc_1-poc_{curr})*MV_0$, that is, MV0 and MV1 for the current block, associated with reference 0 and reference 1, respectively, are aligned.

g. $|(poc_0-poc_{curr})*MV_1-(poc_1-poc_{curr})*MV_0|<T$ where T is a threshold or level.

h. a combination of conditions d, e, f and/or g above, e.g., d and f, d or f, etc.

A subset of samples in the blocks may be used to derive the IC parameters according to any of the embodiments of the present disclosure, in order to reduce the amount of calculation, therefore reducing complexity.

In one embodiment, the IC function may include equation 1 or other linear or nonlinear functions of the IC parameters. For example, the IC function may only consider the slope parameter without the intercept parameter, i.e. $IC(x)=a*x$, In one embodiment, the IC parameters may be more than two parameters, depending on the function (e.g., depending on the degree of a polynomial function).

In one embodiment, equation 4 may be based on an absolute difference, instead of a square of difference. In one embodiment, equation 13 may be based on an absolute difference, instead of a squared difference. In some embodiments, any of equations 14-18 may be based on a squared difference instead of an absolute difference. More generally, other difference functions may be used.

In some embodiments, the methods according to the present disclosure may also be used for uni-prediction IC, by disregarding or not computing one of the sets of IC parameters. In one embodiment, ($a_0$, $b_0$) (or ($a_1$, $b_1$)) may be disregarded or not determined in step 1130 of FIG. 11. As a result, steps 1140 (or 1145) and step 1150 are bypassed. In one embodiment, ($a_0$, $b_0$) (or ($a_1$, $b_1$)) may be disregarded after step 1220. As a result, step 1240 (or 1145) and step 1250 are bypassed.

Test results show that, when encoding and decoding in accordance with the embodiment in FIG. 11, using several tests video sequences of various characteristics and size, the average rate reductions for Y, U, V samples may be respectively up to 0.26%, 0.05% and 0.21% BD (Bjøntegaard-Delta) for equivalent Peak Signal to Noise Ratio (PSNR), with a small increase in encoding and decoding running times compared to the prior art. In other words, improved compression efficiency may be achieved with a small added cost in complexity.

Figure 15:
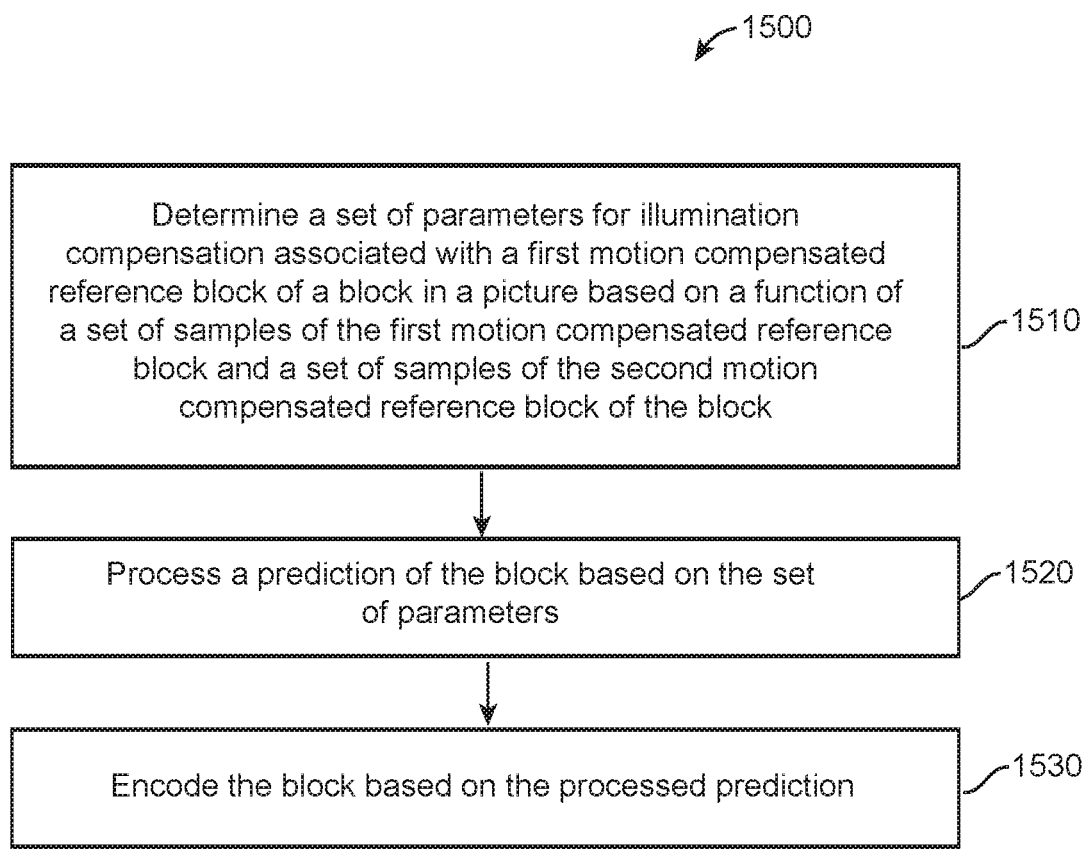
FIG. 15 illustrates a flowchart of an exemplary method of video encoding in accordance with an embodiment of the present disclosure.

FIG. 15 illustrates a flowchart 1500 of an exemplary method of video encoding in accordance with one embodiment of the present disclosure. The method 1500 includes, at step 1510, determining a set of parameters for illumination compensation associated with a first motion compensated reference block (or first motion compensated block) of a block in a picture of a video based on a function of a set of samples of the first motion compensated reference block and a (corresponding) set of samples of a second motion compensated reference block (or second motion compensated block) of the block. Then, at step 1520, the method 1500 includes processing a prediction of the block based on the set of parameters, the prediction being associated with the first motion compensated reference block. Finally, at step 1530, the method 1500 includes encoding the block based on the processed prediction. Steps 1510 to 1530 may be performed, e.g., by encoder 700 or 800. In particular, steps 1510 and 1520 may be performed by, e.g., module 770, 775, 870 (871, 873) and/or 875 (876, 878). The set of parameters may be, e.g., ($a_0$, $b_0$). The first motion compensated reference block may be, e.g., ref-0 (MC-0) 120. The second motion compensated reference block may be, e.g., ref-1 (MC-1) 125. The prediction may be, e.g., pred0. The block may be, e.g., current block 160. The picture may be, e.g., current picture 150. The motion compensated blocks (e.g., ref-0 and ref-1) and respective predictions (e.g., pred0 and pred1) may have one of different resolutions and the same resolution. For example, the motion compensated blocks have full-pel resolution and the predictions may have sub-pel resolution. Or, for example, both the motion compensated blocks and the predictions may have sub-pel resolution.

The set of parameters, the block, the picture, the function and the prediction may be alternately called the first set of parameters, the first block, the first picture, the first function and first prediction, respectively. The first motion compensated reference block may be associated with a first reference picture. The first reference picture may be, e.g., reference 0 110. The second motion compensated reference block may be associated with a second reference picture. The second reference picture may be, e.g., reference 1, 115. The picture, the first reference picture and the second reference picture may each be distinct pictures. The set of parameters may include at least one parameter, e.g., at least one amplitude scale or slope parameter, amplitude shift or intercept parameter, position scale parameter, position shift parameter, temporal scale parameter, temporal shift parameter, etc. The prediction may be an inter-prediction of the block associated with the first motion compensated reference block. The block may be a reconstructed block. The function is not a function of samples of the block, neighboring samples of the block, neighboring samples of the first motion compensated reference block or neighboring samples of the second motion compensated reference block. The first motion compensated reference block, second motion compensated reference block and the prediction may be accessed or determined prior to performing the method 1500.

According to one embodiment of the method, the step of determining 1510 may further include determining a second set of parameters for illumination compensation associated with a second motion compensated reference block of the block based on the function. In other words, a second set of parameters is further determined based on the function. The second set of parameters includes at least one parameter, e.g., at least one amplitude scale or slope parameter, amplitude shift or intercept parameter, position scale parameter, position shift parameter, temporal scale parameter, temporal shift parameter, etc. The second set of parameters may be, e.g., $(a_1, b_1)$.

According to one embodiment of the method, the step of processing may further include processing a second prediction of the block based on the second set of parameters, the second prediction being associated with the second motion compensated reference block. In other words, a second prediction of the block is processed according to the second set of parameters. The second prediction may be an inter-prediction of the block associated with the motion compensated second reference block. The second prediction may be accessed or determined prior to performing the method 1500. The second prediction may be, e.g., pred1.

According to one embodiment of the method, the step of encoding 1530 may be further based on the processed second prediction. In other words, the block is encoded further based on the processed second prediction.

Determining a second set of IC parameters, processing a second prediction and encoding further based on the second processed prediction may be optional, bypassed or removed when the encoder performs uni-IC and/or uni-prediction.

According to one embodiment of the method, the (first or second) set of samples may include all samples in the (first or second) motion compensated reference block corresponding to the set of samples, e.g., all samples in ref-0 (or in ref-1).

According to one embodiment of the method, the set of parameters (or the second set of parameters) may include a slope parameter and an intercept parameter, e.g., $(a_0, b_0)$ (or $(a_1, b_1)$).

According to one embodiment of the method, the function may be one of a sum of a squared difference and a sum of an absolute difference, the squared difference and the absolute difference being between a sample in the set of samples of the first motion compensated reference block transformed by the set of parameters and a corresponding sample in the set of samples of the second motion compensated reference block. Equation 4 applies to the embodiment. The sum may be performed over all samples in the set of samples (of ref-0 and corresponding set of samples ref-1) or all samples in the reference block (ref-0 and corresponding ref-1).

According to one embodiment of the method, the function may be one of a sum of a squared difference and a sum of an absolute difference, the squared difference and the absolute difference being between a sample in the set of samples of the first motion compensated reference block transformed by the set of parameters and a corresponding sample in the set of samples of the second motion compensated reference block transformed by a second set of parameters. The second set of parameters may be, e.g., $(a_1, b_1)$. Equation 13 applies to this embodiment. The sum may be performed over all samples in the set of samples (of ref-0 and corresponding set of samples ref-1) or all samples in the reference blocks (ref-0 and corresponding ref-1).

According to one embodiment of the method, the sample in the set of samples may be transformed by a linear function of a corresponding set of parameters. Equations 4 or 13 apply to this embodiment.

According to one embodiment of the method, a third set of parameters may minimize the function and the set of parameters is determined from the third set of parameters based on a relative temporal distance between the picture and a first reference picture associated with the first motion compensated reference block. Equation 4 applies to this embodiment. The third set of parameters is (a', b'). The relative temporal distance a is defined in equation 9.

According to one embodiment of the method, a third set of parameters may minimize the function and the second set of parameters is determined from the third set of parameters based on a relative temporal distance between the picture and a first reference picture associated with the first motion compensated reference block. Equation 4 applies to this embodiment. The third set of parameters is (a', b'). The relative temporal distance a is defined in equation 9.

According to one embodiment of the method, the determination from the third set of parameters may be further based on an equality between a sample in the first motion compensated reference block transformed by the set of parameters and a sample in the second motion compensated reference block transformed by the second set of parameters. The equality holds for every sample in the set of samples. Equation 5 applies to this embodiment.

According to one embodiment of the method, the set of parameters and the second set of parameters may minimize the function. Equation 13 applies to this embodiment.

According to one embodiment of the method, a value of the function for the set of parameters and the second set of parameters may be less than an average value of the function.

According to one embodiment of the method, IC may be enabled based on the size of the block.

According to one embodiment of the method, IC may be enabled based on the picture order count of the picture, the first reference picture and the second reference picture. Items d to h above apply to this embodiment.

In one embodiment a selection may be made between any of the previous embodiments according to the present disclosure ($IC_{blocks}$) and the prior art method of FIG. 2 ($IC_{L-shapes}$) based on a cost function. The cost function is identified in items a to c above. IC parameters are determined for $IC_{blocks}$ and $IC_{L-shapes}$ The IC parameters that minimize the cost function, whether for $IC_{blocks}$ or $IC_{L-shapes}$, are selected. Items a to c above apply to this embodiment.

According to one embodiment of the method, at least one flag may be included (and optionally encoded) in the encoded video (as syntax element(s)), the at least one flag indicating whether illumination compensation is to be applied to at least one of the block, a slice of the picture, the picture and the video.

According to one embodiment of the method, the at least one flag may be retrieved at the decoder indicating whether illumination compensation is to be applied to at least one of the block, a slice of the picture, the picture and the video.

According to one embodiment of the method, the at least one of the set of parameters and the second set of parameters may be included (and optionally encoded) in the encoded video as syntax element(s).

According to one embodiment of the method, the at least one of the set of parameters and the second set of parameters may be determined at the video decoder by retrieving the at least one of the set of parameters and the second set of parameters from the encoded video.

According to one embodiment, the method may further include receiving the picture, partitioning the picture into a plurality of blocks including the block, determining a prediction residual for the block, transforming and quantizing the residual to obtain a plurality of transform coefficients and entropy encoding the residual. The steps of transforming and quantizing may be performed by, e.g., modules 725 and 730 of encoder 700. The step of entropy encoding may be performed by, e.g., module 745 of encoder 700. The steps of receiving, transforming and quantizing may be optional, bypassed or removed, since they may have been previously performed by another device and/or the results may have been stored in memory.

It is to be understood that any of the embodiments of the method 1500 described above may be implemented by encoder 700 or 800. The blocks of encoder 700 or 800 may be implemented by hardware (e.g., integrated circuits) or in software, stored in memory and executed by a processor.

Figure 16:
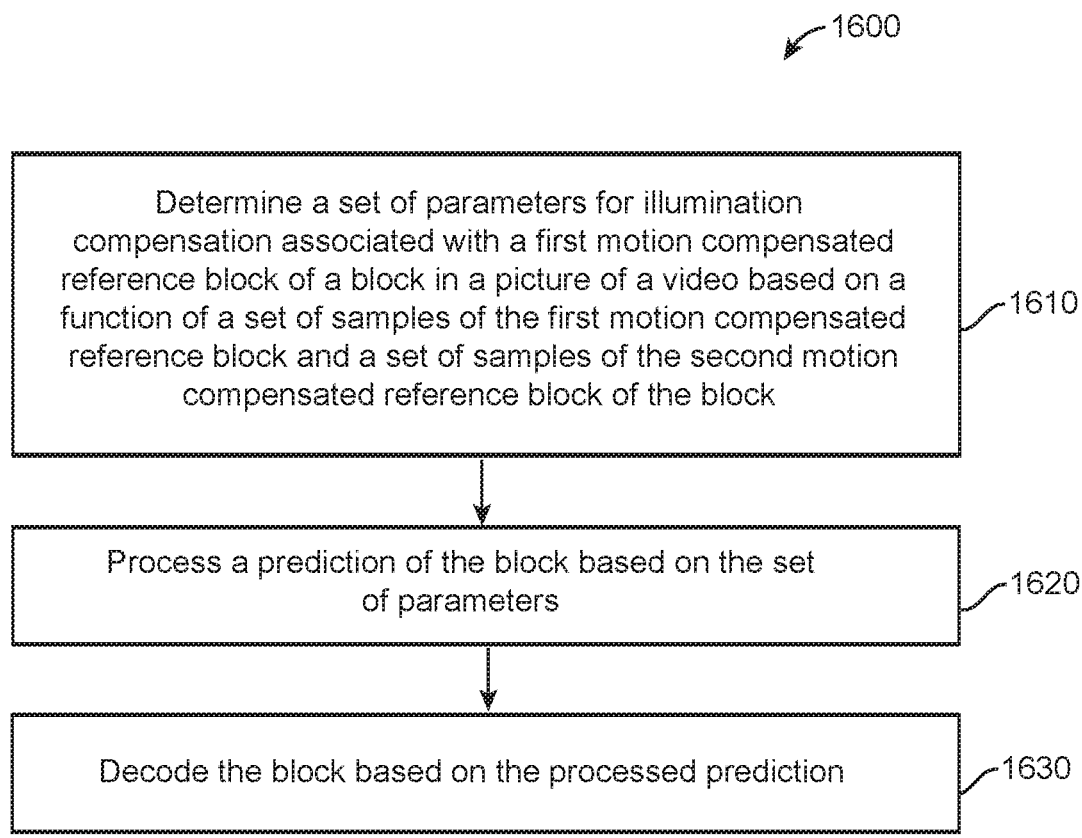
FIG. 16 illustrates a flowchart of an exemplary method of video decoding in accordance with an embodiment of the present disclosure.

FIG. 16 illustrates a flowchart 1600 of an exemplary method of video decoding in accordance with one embodiment of the present disclosure. The method 1600 includes, at step 1610, determining a set of parameters for illumination compensation associated with a first motion compensated reference block (or first motion compensated block) of a block in a picture of a video based on a function of a set of samples of the first motion compensated reference block and a (corresponding) set of samples of a second motion compensated reference block (or second motion compensated block) of the block. Then, at step 1620, the method 1600 includes processing a prediction of the block based on the set of parameters, the prediction being associated with the first motion compensated reference block. Finally, at step 1630, the method 1600 includes decoding the block based on the processed prediction. Steps 1610 to 1630 may be performed, e.g., by decoder 900 or 1000. In particular, steps 1610 and 1620 may be performed by, e.g., module 970 or 1070 (1071, 1073). The set of parameters may be, e.g., ($a_0$, $b_0$). The first motion compensated reference block may be, e.g., ref-0 (MC-0) 120. The second motion compensated reference block may be, e.g., ref-1 (MC-1) 125. The prediction may be, e.g., pred0. The block may be, e.g., current block 160. The picture may be, e.g., current picture 150. The motion compensated blocks (e.g., ref-0 and ref-1) and respective predictions (e.g., pred0 and pred1) may have one of different resolutions and the same resolution. For example, the motion compensated blocks have full-pel resolution and the predictions may have sub-pel resolution. Or, for example, both the motion compensated blocks and the predictions may have sub-pel resolution.

The set of parameters, the block, the picture, the function and the prediction may be alternately called the first set of parameters, the first block, the first picture, the first function and the first prediction, respectively. The first motion compensated reference block may be associated with a first reference picture. The first reference picture may be, e.g., reference 0 110. The second motion compensated reference block may be associated with a second reference picture. The second reference picture may be, e.g., reference 1, 115. The picture, the first reference picture and the second reference picture may each be distinct pictures. The set of parameters includes at least one parameter, e.g., at least one amplitude scale or slope parameter, amplitude shift or intercept parameter, position scale parameter, position shift parameter, temporal scale parameter, temporal shift parameter, etc. The prediction may be an inter-prediction of the block associated with the first motion compensated reference block. The block may be a reconstructed block. The function is not a function of samples of the block, neighboring samples of the block, neighboring samples of the first motion compensated reference block or neighboring samples of the second motion compensated reference block. The first motion compensated reference block, the second motion compensated reference block and the prediction are accessed or determined prior to performing the method 1600.

According to one embodiment of the method, the step of determining 1610 may further include determining a second set of parameters for illumination compensation associated with a second motion compensated reference block of the block based on the function. In other words, a second set of parameters is further determined based on the function. The second set of parameters may include at least one parameter, e.g., at least one amplitude scale or slope parameter, amplitude shift or intercept parameter, position scale parameter, position shift parameter, temporal scale parameter, temporal shift parameter, etc. The second set of parameters may be, e.g., ($a_1$, $b_1$).

According to one embodiment of the method, the step of processing step 1620 may further include processing a second prediction of the block based on the second set of parameters, the second prediction being associated with the second motion compensated reference block. In other words, a second prediction of the block is processed according to the second set of parameters. The second prediction may be an inter-prediction of the block associated with the second motion compensated reference block. The second prediction may be accessed or determined prior to performing the method 1600. The second prediction may be, e.g., pred1.

According to one embodiment of the method, the step of decoding 1630 may be further based on the processed second prediction. In other words, the block is decoded further based on the processed second prediction.

Determining a second set of IC parameters, processing a second prediction and decoding further based on the second processed prediction may be optional, bypassed or removed for when the encoder performs uni-IC and/or uni-prediction.

According to one embodiment of the method, the (first or second) set of samples may include all samples in the (first or second) motion compensated reference block corresponding to the set of samples, e.g., all samples in ref-0 (or in ref-1).

According to one embodiment of the method, the set of parameters (or the second set of parameters) includes a slope parameter and an intercept parameter, e.g., ($a_0$, $b_0$) (or ($a_1$, $b_1$)).

According to one embodiment of the method, the function may be one of a sum of a squared difference and a sum of an absolute difference, the squared difference and the absolute difference being between a sample in the set of samples of the first motion compensated reference block transformed by the set of parameters and a corresponding sample in the set of samples of the second motion compensated reference block. Equation 4 applies to the embodiment. The sum may be performed over all samples in the set of samples (of ref-0 and corresponding set of samples ref-1) or all samples in the reference block (ref-0 and corresponding ref-1).

According to one embodiment of the method, the function may be one of a sum of a squared difference and a sum of an absolute difference, the squared difference and the absolute difference being between a sample in the set of samples of the first motion compensated reference block transformed by the set of parameters and a corresponding sample in the set of samples of the second motion compensated reference block transformed by a second set of parameters. The second set of parameters may be, e.g., ($a_1$, $b_1$). Equation 13 applies to this embodiment. The sum may be performed over all samples in the set of samples or all samples in the reference blocks (ref-0, ref-1).

According to one embodiment of the method, the sample in the set of samples may be transformed by a linear function of a corresponding set of parameters. Equations 4 or 13 apply to this embodiment.

According to one embodiment of the method, a third set of parameters may minimize the function and the set of parameters is determined from the third set of parameters based on a relative temporal distance between the picture and a first reference picture associated with the first motion compensated reference block. Equation 4 applies to this embodiment. The third set of parameters is (a', b'). The relative temporal distance a is defined in equation 9. In one embodiment, the According to one embodiment of the method, a third set of parameters may minimize the function and the second set of parameters is determined from the third set of parameters based on a relative temporal distance between the picture and a first reference picture associated with the first motion compensated reference block. Equation 4 applies to this embodiment. The third set of parameters is (a', b'). The relative temporal distance a is defined in equation 9.

According to one embodiment of the method, the determination from the third set of parameters may be further based on an equality between a sample in the first motion compensated reference block transformed by the set of parameters and a sample in the second motion compensated reference block transformed by the second set of parameters. The equality holds for every sample in the set of samples. Equation 5 applies to this embodiment.

According to one embodiment of the method, the set of parameters and the second set of parameters may minimize the function. Equation 13 applies to this embodiment.

According to one embodiment of the method, a value of the function for the set of parameters and the second set of parameters may be less than an average value of the function.

According to one embodiment of the method, IC may be enabled based on the size of the block.

According to one embodiment of the method, IC may be enabled based on the picture order count of the picture, the first reference picture and the second reference picture. Items d to h above apply to this embodiment.

In one embodiment a selection may be made between any of the previous embodiments according to the present disclosure ($IC_{blocks}$) and the prior art ($IC_{L-shapes}$) based on a cost function. The cost function is identified in items a to c. IC parameters are determined for $IC_{blocks}$ and $IC_{L-shapes}$ The IC parameters that minimize the cost function, whether for $IC_{blocks}$ or $IC_{L-blocks}$, are selected. Items a to b above apply to this embodiment.

According to one embodiment of the method, at least one flag may be included (and optionally encoded) in the encoded video (as syntax element(s)), the at least one flag indicating whether illumination compensation is to be applied to at least one of the block, a slice of the picture, the picture and the video.

According to one embodiment of the method, the at least one flag may be retrieved at the decoder indicating whether illumination compensation is to be applied to at least one of the block, a slice of the picture, the picture and the video.

According to one embodiment of the method, the at least one of the set of parameters and the second set of parameters may be included (and optionally encoded) in the encoded video as syntax element(s).

According to one embodiment of the method, the at least one of the set of parameters and the second set of parameters may be determined at the video decoder by retrieving the at least one of the set of parameters and the second set of parameters from the encoded video.

According to one embodiment, the method may further include receiving the encoded picture, entropy decoding the block, inverse transforming the block to obtain decoded residuals, combining the decoded residuals with a predicted sample block to obtain a decoded/reconstructed image block. The transform coefficients may be further inverse quantized prior to inverse transformed. The steps of entropy decoding, inverse transforming and inverse quantizing may be performed by, e.g., modules 930, 950 and 940 of decoder 900, respectively. The steps of receiving, entropy decoding, inverse transforming and inverse quantizing, and combining may be optional, bypassed or removed, since they may have been previously performed by another device and/or provided to another device, or the results may have been retrieved from and/or stored in memory.

It is to be understood that any of the embodiments of the method 1600 described above may be implemented by decoder 900 or 1000. The modules of decoder 900 or 1000 may be implemented by hardware (e.g., integrated circuits) or in software, stored in memory and executed by a processor.

Figure 17:
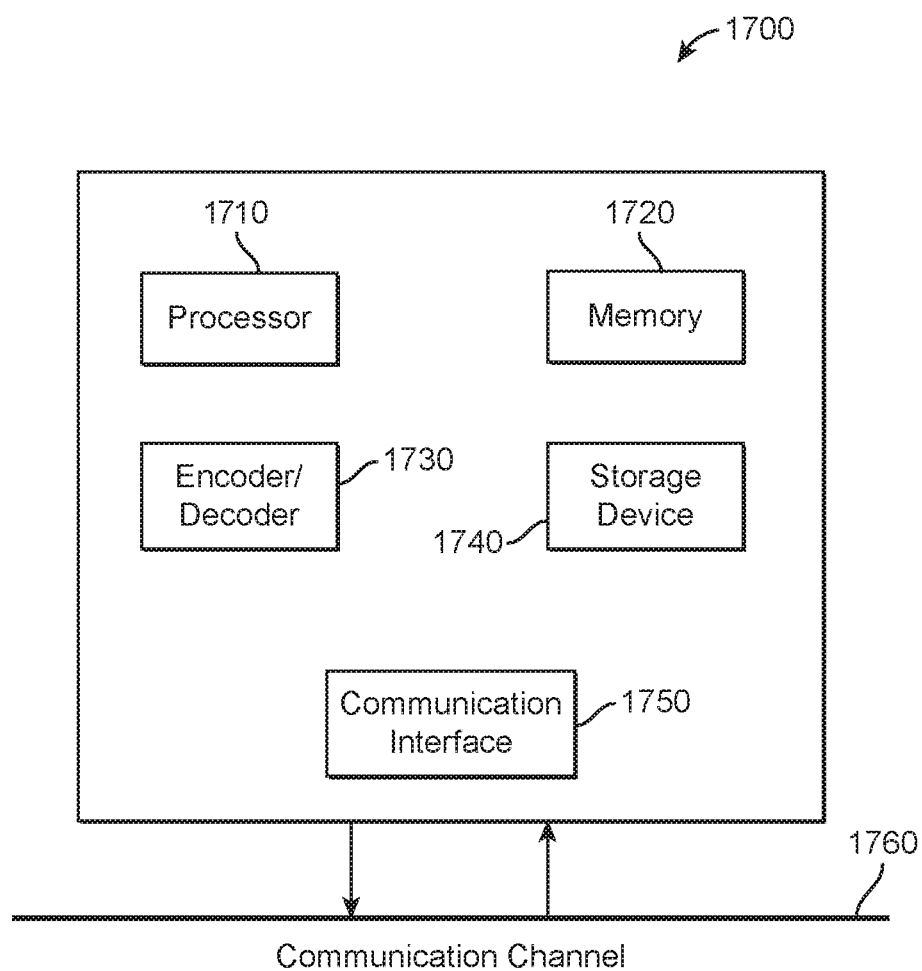
FIG. 17 illustrates a block diagram of a computing environment within which aspects of the present disclosure can be implemented and executed.

FIG. 17 illustrates a block diagram 1700 of an exemplary system in which various aspects of the exemplary embodiments of the present disclosure may be implemented. System 1700 may be embodied as a device including the various components described below and is configured to perform the processes described above. Examples of such devices, include, but are not limited to, personal computers, laptop computers, smartphones, smart watches, tablet computers, digital multimedia set top boxes, digital television receivers, personal video recording systems, connected home appliances, and servers. System 1700 may be communicatively coupled to other similar systems, and to a display via a communication channel as shown in FIG. 17 and as known by those skilled in the art to implement the exemplary video system described above. System 1700 may implement encoder 700 or 800, decoder 900 or 1000 or encoder(s) and decoder(s), independently or jointly. Moreover, system 1700 may implement and be configured to execute any of the processes of the present disclosure, including method 1100, 1200, 1300, 1400, 1500 and/or 1600, independently or jointly.

The system 1700 may include at least one processor 1710 configured to execute instructions loaded therein for implementing the various processes as discussed above. Processor 1710 may include embedded memory, input output interface and various other circuitries as known in the art. The system 1700 may also include at least one memory 1720 (e.g., a volatile memory device such as RAM, a non-volatile memory device such as ROM). System 1700 may additionally include a storage device 1740, which may include non-volatile memory, including, but not limited to, an erasable programmable read-only memory (EPROM), ROM, a programmable read-only memory (PROM), a dynamic RAM (DRAM), a static RAM (SRAM), flash memory, magnetic disk drive, and/or optical disk drive. The storage device 1740 may comprise an internal storage device, an attached storage device and/or a network accessible storage device, as non-limiting examples. System 1700 may also include an encoder/decoder module 1730 configured to process data to provide an encoded video or decoded video.

Encoder/decoder module 1730 represents the module(s) that may be included in a device to perform the encoding and/or decoding functions, for example, according to FIG. 7 (or 8) and 9 (or 10), respectively. As is known in the art of compression, a device may include one or both of the encoding and decoding modules. Additionally, encoder/decoder module 1730 may be implemented as a separate element of system 1700 or may be incorporated within processors 1710 as a combination of hardware and software as known to those skilled in the art. For example, encoder/decoder module 1730 may be implemented as one or two separate integrated circuits and/or field-programmable gate array (FPGA).

Program code to be loaded onto processors 1710 to perform the various processes described hereinabove may be stored in storage device 1740 and subsequently loaded onto memory 1720 for execution by processors 1710. In accordance with the exemplary embodiments of the present disclosure, one or more of the processor(s) 1710, memory 1720, storage device 1740 and encoder/decoder module 1730 may store one or more of the various items during the performance of the processes discussed herein above, including, but not limited to the input video, the decode video, the bitstream, equations, formula, matrices, variables, operations, and operational logic.

The system 1700 may also include communication interface 1750 that enables communication with other devices via communication channel 1760. The communication interface 1750 may include, but is not limited to a transceiver configured to transmit and receive data from communication channel 1760. The communication interface may include, but is not limited to, a modem or network card and the communication channel may be implemented within a wired and/or wireless medium. The various components of system 1700 may be connected or communicatively coupled together using various suitable connections, including, but not limited to internal buses, wires, and printed circuit boards.

The exemplary embodiments according to the present disclosure may be carried out by computer software executed by the processor 1710 or by hardware, or by a combination of hardware and software. As a non-limiting example, the exemplary embodiments according to the present disclosure may be implemented by one or more integrated circuits. The memory 1720 may be of any type appropriate to the technical environment and may be implemented using any appropriate data storage technology, such as optical memory devices, magnetic memory devices, semiconductor-based memory devices, fixed memory and removable memory, as non-limiting examples. The processor 1710 may be of any type appropriate to the technical environment, and may encompass one or more of microprocessors, general purpose computers, special purpose computers and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants (PDAs), and other devices that facilitate communication of information between end-users.

According to an aspect of the present disclosure, an apparatus 1700 for video encoding is provided, the apparatus including a processor 1710, and at least one memory 1720, 1740 coupled to the processor, the processor 1710 being configured to perform any of the embodiments of the method of video encoding 1500 described above.

According to an aspect of the present disclosure, an apparatus 1700 for video decoding is provided, the apparatus including a processor 1710, and at least one memory 1720, 1740 coupled to the processor, the processor 1710 being configured to perform any of the embodiments of the method of video decoding 1600 described above.

According to an aspect of the present disclosure, an apparatus for video encoding is provided including means for determining a set of parameters for illumination compensation associated with a first reference block of a block in a picture of a video based on a function of a set of samples of the first reference block and a set of samples of a second reference block of the block, means for processing a prediction of the block based on the set of parameters, the prediction being associated with the first reference block and means for encoding the block based on the processed prediction. The video encoders of FIGS. 7, 8 and 17 may include the structure or means of the apparatus, particularly, blocks 770, 775, 870, 875, 1710 and 1730. The apparatus for video encoding may perform any of the embodiments of any of the methods 1100, 1200, 1300, 1400 and/or 1500 of video encoding.

According to an aspect of the present disclosure, an apparatus for video decoding is provided including means for determining a set of parameters for illumination compensation associated with a first reference block of a block in a picture of an encoded video based on a function of a set of samples of the first reference block and a set of samples of a second reference block of the block, means for processing a prediction of the block based on the set of parameters, the prediction being associated with the first reference block and means for decoding the block based on the processed prediction. FIGS. 9, 10 and 17 may include the structure or means of the apparatus for video decoding, particularly, blocks 970, 1070, 1710 and 1730. The apparatus for video decoding may perform any of the embodiments of any of the method 1100, 1200, 1300, 1400 and/or 1600 of video decoding.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

According to an aspect of the present disclosure, a signal including a bitstream formatted to include encoded data representative of a block of a picture, the encoded data encoded according to any of the embodiments of any of the methods 1100, 1200, 1300, 1400 and/or 1500 of video encoding.

According to an aspect of the present disclosure, a bitstream formatted to include encoded data representative of a block of a picture, the encoded data encoded according to any of the embodiments of any of the methods 1100, 1200, 1300, 1400 and/or 1500 of video encoding.

Moreover, any of the methods 1100, 1200, 1300, 1400, 1500 and/or 1600 may be implemented as a computer program product (independently or jointly) comprising computer executable instructions which may be executed by a processor. The computer program product having the computer-executable instructions may be stored in the respective transitory or non-transitory computer-readable storage media of the system 1700, encoder 700 (or 800) and/or decoder 900 (or 1000).

According to an aspect of the present disclosure, a computer program product is provided including program code instructions for performing any of the embodiments of any of the methods 1100, 1200, 1300, 1400, 1500 and/or 1600 (independently or jointly) of the present disclosure.

It is important to note that one or more of the elements in the processes 1100, 1200, 1300, 1400, 1500 and/or 1600 may be combined, performed in a different order, or excluded in some embodiments while still implementing the aspects of the present disclosure. Other steps may be performed in parallel, where the processor does not wait for a full completion of a step before starting another.

Furthermore, aspects of the present disclosure can take the form of a computer-readable storage medium. Any combination of one or more computer-readable storage medium(s) may be utilized. A computer-readable storage medium can take the form of a computer-readable program product embodied in one or more computer-readable medium(s) and having computer-readable program code embodied thereon that is executable by a computer. A computer-readable storage medium as used herein is considered a non-transitory storage medium given the inherent capability to store the information therein as well as the inherent capability to provide retrieval of the information therefrom. A computer-readable storage medium may be, for example, but is not limited to, an electronic, magnetic, optical, electromagnetic, infrared, or semiconductor system, apparatus, or device, or any suitable combination of the foregoing.

It is to be appreciated that the following list, while providing more specific examples of computer-readable storage mediums to which the present disclosure may be applied, is merely an illustrative and not exhaustive listing as is readily appreciated by one of ordinary skill in the art. The list of examples includes a portable computer diskette, a hard disk, a ROM, EPROM, Flash memory, a portable compact disc read-only memory (CD-ROM), an optical storage device, a magnetic storage device, or any suitable combination of the foregoing.

According to an aspect of the present disclosure, a computer-readable storage medium carrying a software program is provided including program code instructions for performing any of the embodiments of any of the methods of the present disclosure, including methods 1100, 1200, 1300, 1400, 1500 and/or 1600.

It is to be understood that reference to "one embodiment" or "an embodiment" or "one implementation" or "an implementation" of the present disclosure, as well as other variations thereof, mean that a particular feature, structure, characteristic, and so forth described in connection with the embodiment is included in at least one embodiment of the present disclosure. Thus, the appearances of the phrase "in one embodiment" or "in an embodiment" or "in one implementation" or "in an implementation", as well any other variations, appearing in various places throughout the specification are not necessarily all referring to the same embodiment.

Additionally, the present disclosure or its claims may refer to "determining" various pieces of information. Determining the information may include one or more of, for example, estimating the information, calculating the information, predicting the information, or retrieving the information from memory.

Also, the present disclosure or its claims may refer to "providing" various pieces of information. Providing the information may include one or more of, for example, outputting the information, storing the information, transmitting the information, sending the information, displaying the information, showing the information, or moving the information.

Moreover, the present disclosure or its claims may refer to "accessing" various pieces of information. Accessing the information may include one or more of, for example, receiving the information, retrieving the information (for example, from memory), storing the information, processing the information, moving the information, copying the information, erasing the information, calculating the information, determining the information, predicting the information, or estimating the information.

Further, the present disclosure or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the various features shown and described are interchangeable. Unless otherwise indicated, a feature shown in one embodiment may be incorporated into another embodiment. Further, the features described in the various embodiments may be combined or separated unless otherwise indicated as inseparable or not combinable.

As noted before, the functions of the various elements shown in the figures may be provided through the use of dedicated hardware as well as hardware capable of executing software in association with appropriate software. Also, when provided by a processor, the functions may be provided by a single dedicated processor, by a single shared processor, or by a plurality of individual processors, some of which may be shared.

It is to be further understood that, because some of the constituent system components and methods depicted in the accompanying drawings are preferably implemented in software, the actual connections between the system components or the process function blocks may differ depending upon the manner in which the processes of present disclosure are programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope of the present disclosure. In addition, individual embodiments can be combined, without departing from the scope of the present disclosure. All such changes and modifications are intended to be included within the scope of the present disclosure as set forth in the appended claims.

The invention claimed is:

1. A method of video decoding comprising:
applying an illumination compensation mode to a current block of a current picture, the illumination compensation mode comprising:
obtaining a first motion compensated reference block of the current block designated by first motion information in a first reference picture and a second motion compensated reference block of the current block designated by second motion information in a second reference picture;
determining an initial set of parameters of an illumination compensation linear model, the initial set of parameters minimizing a sum of a squared difference or a sum of an absolute difference between values of samples of the first motion compensated reference block of the first reference picture of the current block and values of samples of the second motion compensated reference block of the second reference picture of the current block;
deriving a first set of parameters of the illumination compensation linear model allowing compensating variation of illumination between the first motion compensated reference block and the current block and a second set of parameters of the illumination compensation linear model allowing compensating variation of illumination between the second motion compensated reference block and the current block, the first set and the second set being derived from the initial set of parameters and from a value representing a relative temporal distance of the current picture to the reference pictures;
applying the illumination compensation linear model with the derived first set of parameters to the first motion compensated reference block to obtain a first illumination compensated predictor, and applying the illumination compensation linear model with the derived second set of parameters to the second motion compensated reference block to obtain a second illumination compensated predictor; and
reconstructing the current block based on the first and the second illumination compensated predictors.

2. The method of claim 1, wherein each parameter of the first set of parameters and of the second set of parameters is a linear function of the value representing the relative temporal distance of current picture to the reference pictures.

3. The method of claim 1, wherein the illumination compensation mode is enabled by a flag at a picture level, a slice level, or a block level.

4. The method of claim 1, further comprising storing the derived first set and second set along with the first motion information and the second motion information, the derived first set and derived second set being re-used for a second current block on which the illumination compensation mode is applied responsive to first motion information and second motion information of the second current block are equal to the stored first motion information and second motion information.

5. The method of claim 1, wherein, responsive to the illumination compensation mode and a frame rate-up conversion mode are enabled for the current block, a process for determining the first and the second motion vector comprises a minimization of a sum of absolute difference or of a sum of squared difference between values representative of samples of the first motion compensated reference block and values representative of samples of the second motion compensated reference block, a value representative of a sample of the first motion compensated reference block being a value of a sample of the first motion compensated reference block from which was subtracted an average of the values of the samples of the first motion compensated reference block and a value representative of a sample of the second motion compensated reference block being a value of a sample of the second motion compensated reference block from which was subtracted an average of the values of the samples of the second motion compensated reference block.

6. The method of claim 1, wherein, responsive to the illumination compensation mode and a frame rate-up conversion mode are enabled for the current block, a process for determining the first and the second motion vector comprises a minimization of a sum of absolute difference or of a sum of squared difference between values representative of samples of the first motion compensated reference block and values representative of samples of the second motion compensated reference block, a value representative of a sample of the first motion compensated reference block being a value of a sample of the first motion compensated reference block on which was applied the illumination compensation linear model with the first set of parameters and a value representative of a sample of the second motion compensated reference block being a value of a sample of the second motion compensated reference block on which was applied the illumination compensation linear model with the second set of parameters.

7. An apparatus for video decoding comprising electronic circuitry adapted for:
  applying an illumination compensation mode to a current block of a current picture, the illumination compensation mode comprising:
    obtaining a first motion compensated reference block of the current block designated by first motion information in a first reference picture and a second motion compensated reference block of the current block designated by second motion information in a second reference picture;
    determining an initial set of parameters of an illumination compensation linear model, the initial set of parameters minimizing a sum of a squared difference or a sum of an absolute difference between values of samples of the first motion compensated reference block of the first reference picture of the current block and values of samples of the second motion compensated reference block of the second reference picture of the current block;
    deriving a first set of parameters of the illumination compensation linear model allowing compensating variation of illumination between the first motion compensated reference block and the current block and a second set of parameters of the illumination compensation linear model allowing compensating variation of illumination between the second motion compensated reference block and the current block, the first set and the second set being derived from the initial set of parameters and from a value representing a relative temporal distance of the current picture to the reference pictures;
    applying the illumination compensation linear model with the derived first set of parameters to the first motion compensated reference block to obtain a first illumination compensated predictor, and applying the illumination compensation linear model with the derived second set of parameters to the second motion compensated reference block to obtain a second illumination compensated predictor; and
    reconstructing the current block based on the first and the second illumination compensated predictors.

8. The apparatus of claim 7, wherein each parameter of the first set of parameters and of the second set of parameters is a linear function of the value representing the relative temporal distance of current picture to the reference pictures.

9. The apparatus of claim 7, wherein the illumination compensation mode is enabled by a flag at a picture level, a slice level, or a block level.

10. The apparatus of claim 7, wherein the electronic circuitry is further adapted for storing the derived first set and second set along with the first motion information and the second motion information, the derived first set and derived second set being re-used for a second current block on which the illumination compensation mode is applied responsive to first motion information and second motion information of the second current block are equal to the stored first motion information and second motion information.

11. The apparatus of claim 7, wherein, responsive to the illumination compensation mode and a frame rate-up conversion mode are enabled for the current block, the electronic circuitry is further adapted for determining the first and the second motion vector comprising a minimization of a sum of absolute difference or of a sum of squared difference between values representative of samples of the first motion compensated reference block and values representative of samples of the second motion compensated reference block, a value representative of a sample of the first motion compensated reference block being a value of a sample of the first motion compensated reference block from which was subtracted an average of the values of the samples of the first motion compensated reference block and a value representative of a sample of the second motion compensated reference block being a value of a sample of the second motion compensated reference block from which was subtracted an average of the values of the samples of the second motion compensated reference block.

12. The apparatus of claim 7, wherein, responsive to the illumination compensation mode and a frame rate-up conversion mode are enabled for the current block, the electronic circuitry is further adapted for determining the first and the second motion vector comprising a minimization of a sum of absolute difference or of a sum of squared difference between values representative of samples of the first motion compensated reference block and values representative of samples of the second motion compensated reference block, a value representative of a sample of the first motion compensated reference block being a value of a sample of the first motion compensated reference block on which was applied the illumination compensation linear model with the first set of parameters and a value representative of a sample of the second motion compensated reference block being a value of a sample of the second motion compensated reference block on which was applied the illumination compensation linear model with the second set of parameters.

13. A method of video encoding comprising:
  applying an illumination compensation mode to a current block of a current picture, the illumination compensation mode comprising:
    obtaining a first motion compensated reference block of the current block designated by first motion information in a first reference picture and a second motion compensated reference block of the current block designated by second motion information in a second reference picture;
    determining an initial set of parameters of an illumination compensation linear model, the initial set of parameters minimizing a sum of a squared difference or a sum of an absolute difference between values of samples of the first motion compensated reference block of the first reference picture of the current block and values of samples of the second motion compensated reference block of the second reference picture of the current block;
    deriving a first set of parameters of the illumination compensation linear model allowing compensating variation of illumination between the first motion compensated reference block and the current block and a second set of parameters of the illumination compensation linear model allowing compensating variation of illumination between the second motion compensated reference block and the current block, the first set and the second set being derived from the initial set of parameters and from a value representing a relative temporal distance of the current picture to the reference pictures;

applying the illumination compensation linear model with the derived first set of parameters to the first motion compensated reference block to obtain a first illumination compensated predictor, and applying the illumination compensation linear model with the derived second set of parameters to the second motion compensated reference block to obtain a second illumination compensated predictor; and encoding the current block based on the first and the second illumination compensated predictors.

14. The method of claim 13, wherein each parameter of the first set of parameters and of the second set of parameters is a linear function of the value representing the relative temporal distance of current picture to the reference pictures.

15. The method of claim 13, wherein the illumination compensation mode is enabled by a flag at a picture level, a slice level, or a block level.

16. The method of claim 15, wherein, the flag disables the illumination compensation mode based on an information representing a difference between the reference pictures and the current picture.

17. The method of claim 16, wherein, the information representing the difference between the reference pictures and the current picture is a result of a comparison of histograms of the reference pictures and a histogram of the current picture.

18. The method of claim 15, wherein, the flag disables the illumination compensation mode based on a number of uses of the illumination compensation mode in reference pictures.

19. The method of claim 13, comprising storing the derived first set and second set along with the first motion information and the second motion information, the derived first set and derived second set being re-used for a second current block on which the illumination compensation mode is applied responsive to first motion information and second motion information of the second current block are equal to the stored first motion information and second motion information.

20. An apparatus for video encoding comprising electronic circuitry adapted for:

applying an illumination compensation mode to a current block of a current picture, the illumination compensation mode comprising:

obtaining a first motion compensated reference block of the current block designated by first motion information in a first reference picture and a second motion compensated reference block of the current block designated by second motion information in a second reference picture;

determining an initial set of parameters of an illumination compensation linear model, the initial set of parameters minimizing a sum of a squared difference or a sum of an absolute difference between values of samples of the first motion compensated reference block of the first reference picture of the current block and values of samples of the second motion compensated reference block of the second reference picture of the current;

deriving a first set of parameters of the illumination compensation linear model allowing compensating variation of illumination between the first motion compensated reference block and the current block and a second set of parameters of the illumination compensation linear model allowing compensating variation of illumination between the second motion compensated reference block and the current block, the first set and the second set being derived from the initial set of parameters and from a value representing a relative temporal distance of the current picture to the reference pictures;

applying the illumination compensation linear model with the derived first set of parameters to the first motion compensated reference block to obtain a first illumination compensated predictor, and applying the illumination compensation linear model with the derived second set of parameters to the second motion compensated reference block to obtain a second illumination compensated predictor; and encoding the current block based on the first and the second illumination compensated predictors.

21. The apparatus of claim 20, wherein each parameter of the first set of parameters and of the second set of parameters is a linear function of the value representing the relative temporal distance of current picture to the reference pictures.

22. The apparatus of claim 20, wherein the illumination compensation mode is enabled by a flag at a picture level, a slice level, or a block level.

23. The apparatus of claim 22, wherein, the flag disables the illumination compensation mode based on an information representing a difference between the reference pictures and the current picture.

24. The apparatus of claim 23, wherein, the information representing the difference between the reference pictures and the current picture is a result of a comparison of histograms of the reference pictures and an histogram of the current picture.

25. The apparatus of claim 22, wherein, the flag disables the illumination compensation mode based on a number of uses of the illumination compensation mode in reference pictures.

26. The apparatus of claim 20, wherein the electronic circuitry is further adapted for storing the derived first set and second set along with the first motion information and the second motion information, the derived first set and derived second set being re-used for a second current block on which the illumination compensation mode is applied responsive to first motion information and second motion information of the second current block are equal to the stored first motion information and second motion information.

* * * * *